US010186250B2

(12) United States Patent
Ochiai et al.

(10) Patent No.: US 10,186,250 B2
(45) Date of Patent: Jan. 22, 2019

(54) SYSTEM AND METHOD FOR MANIPULATING OBJECTS IN A COMPUTATIONAL ACOUSTIC-POTENTIAL FIELD

(71) Applicant: Pixie Dust Technologies, Inc., Tokyo (JP)

(72) Inventors: Yoichi Ochiai, Tokyo (JP); Takayuki Hoshi, Tokyo (JP); Jun Rekimoto, Yokohama (JP)

(73) Assignee: Pixie Dust Technologies, Inc., Minato-Ku, Tokyo (JP)

( * ) Notice: Subject to any disclaimer, the term of this patent is extended or adjusted under 35 U.S.C. 154(b) by 585 days.

(21) Appl. No.: 14/788,772

(22) Filed: Jun. 30, 2015

(65) Prior Publication Data
US 2017/0004819 A1    Jan. 5, 2017

(51) Int. Cl.
*G10K 11/34*    (2006.01)
*G10K 15/00*    (2006.01)
*G09G 3/00*    (2006.01)

(52) U.S. Cl.
CPC ............. *G10K 15/00* (2013.01); *G09G 3/003* (2013.01); *G10K 11/346* (2013.01); *G09G 2310/0267* (2013.01); *G09G 2310/0275* (2013.01)

(58) Field of Classification Search
CPC .... G10K 15/00; G10K 11/346; G10K 11/341; G10K 11/343; G10K 11/345;
(Continued)

(56) References Cited

U.S. PATENT DOCUMENTS 6,029,519 A * 2/2000 Kuklinski ................. 73/570.5
6,055,859 A * 5/2000 Kozuka et al. ............. 73/570
(Continued)

OTHER PUBLICATIONS

Peter C. Barnum et al, "A Multi-Layered Display with Water Drops", ACM Transactions on Graphics (SIGGRAPH), vol. 29, No. 4, Jul. 2010, p. 76:1-p. 76:7.
(Continued)

*Primary Examiner* — Manish S Shah
*Assistant Examiner* — Rose M Miller
(74) *Attorney, Agent, or Firm* — Amster, Rothstein & Ebenstein LLP

(57) ABSTRACT

A novel system and method based on three-dimensional acoustic-manipulation technology is disclosed. By changing the distribution of an acoustic-potential field generated by ultrasonic phased arrays, objects can be levitated and animated. Various distributions of acoustic-potential fields can be generated in accordance with the present invention, including acoustic-potential fields having arbitrary shapes, including any three-dimensional shapes. One or more ultrasonic phased arrays surrounding a workspace can be used to generate standing waves of various shapes to provide the acoustic-potential fields. Objects can be suspended at the nodes of the acoustic-potential field so that the ultrasound distribution (i.e., the desired arbitrary shape) is visualized. The system and method can be used to realize floating screen or mid-air raster graphics, mid-air vector graphics, and interaction with levitated objects. The system and method can also be used in other applications, including cleaning applications.

15 Claims, 23 Drawing Sheets

(58) Field of Classification Search
CPC ........ G09G 3/003; G09G 3/001; G09G 3/002;
G09G 2310/0267; G09G 2310/0275;
G01H 9/022; G01H 9/002; G03H 3/00;
G01N 15/1404; G01N 15/1459; G01N
2015/149; G01N 15/1463; G01N
2015/142
USPC ......... 73/570.5, 655, 656, 649, 61.75, 64.56
See application file for complete search history.

(56) References Cited

U.S. PATENT DOCUMENTS

| | | | |
|---|---|---|---|
| 6,216,538 B1 * | 4/2001 | Yasuda et al. ............... | 73/570.5 |
| 6,997,558 B2 | 2/2006 | Perlin | |
| 8,169,621 B2 | 5/2012 | Gharib et al. | |
| 8,450,674 B2 | 5/2013 | Yang et al. | |
| 2008/0272034 A1 * | 11/2008 | Ferren et al. ............... | 73/570.5 |
| 2017/0289722 A1 * | 10/2017 | Ochiai ................... | H04R 1/403 |

OTHER PUBLICATIONS

Mark T. Marshall et al., "Ultra-Tangibles: Creating Movable Tangible Objects on Interactive Tables", SProceedings of the SIGCHI Conference on Human Factors in Computing Systems, May 5-10, 2012, Austin, Texas, USA, pp. 2185-1288.

Masahiro Nakamura et al., "Mounting and Application of Bubble Display System: bubble cosmos", Proceedings of the 2006 ACM SIGCHI international conference on Advances in computer entertainment technology, Jun. 14-16, 2006, Hollywood, California.

Anton Nijholt et al., "Smart Material Interfaces: 'A Material Step to the Future", Proceedings of the 1st workshop on Smart Material Interfaces: A Material Step to the Future, pp. 1-3, Oct. 26-26, 2012, Santa Monica, California.

Yoichi Ochiai et al., "Poppable Display: A display that enables popping, breaking, and tearing interactions with people", 2013 IEEE 2nd Global Conference on Consumer Electronics (GCCE), pp. 124-128.

Yoichi Ochiai et al., "Three-Dimensional Mid-Air Acoustic Manipulation by Ultrasonic Phased Arrays", PLoS One, vol. 9, Issue 5, e97590, pp. 1-5 (2014).

E. H. Brandt, "Levitation in Physics", Science, vol. 243, 4889, pp. 349-355 (Jan. 20, 1989).

Tom Carter et al., "UltraHaptics: multi-point mid-air haptic feedback for touch surfaces". In Proceedings of the 26th annual ACM symposium on User interface software and technology (UIST '13). ACM, New York, NY, USA, 505-514. (2013).

Oliver S. Cossairt et al., "Occlusion-Capable Multiview Volumetric Three-Dimensional Display", Applied Optics, vol. 46, Issue 8, pp. 1244-1250 (2007).

Sean Follmer et al., "inFORM: dynamic physical affordances and constraints through shape and object actuation". In Proceedings of the 26th annual ACM symposium on User interface software and technology (UIST '13). ACM, New York, NY, USA, 417-426. (2013).

Daniele Foresti et al., "Acoustophoretic contactless transport and handling of matter in air", Proceedings of the National Academy of Sciences, [online] <www.pnas.org/cgi/doi/10.1073/pnas.1301860110>.

Seth Copen Goldstein et al., "Programmable Matter", Computer, vol. 38, No. 6, p. 99-101 (Jun. 2005).

Jeremy M. Heiner et al., "The Information Percolator: Ambient Information Display in a Decorative Object", Proceedings of the 12th annual ACM symposium on User interface software and technology, p. 141-148, Nov. 7-10, 1999, Asheville, North Carolina, USA.

Takayuki Hoshi et al., "Noncontact Tactile Display Based on Radiation Pressure of Airborne Ultrasound", IEEE Transactions on Haptics, vol. 3, No. 3, pp. 155-165 (Jul. 2010).

Takayuki Hoshi, "Compact Ultrasound Device for Noncontact Interaction", Proceedings of the 9th international conference on Advances in Computer Entertainment, Nov. 3-5, 2012, Kathmandu, Nepal. vol. 7624 of Lecture Notes in Computer Science, pp. 502-505, 2012.

Hiroshi Ishii et al., "Tangible Bits: Towards Seamless Interfaces between People, Bits and Atoms", Proceedings of the ACM SIGCHI Conference on Human factors in computing systems, p. 234-241, Mar. 22-27, 1997, Atlanta, Georgia, USA.

Hiroshi Ishii et al., "Radical Atoms: Beyond Tangible Bits, Toward Transformable Materials", interactions, vol. 19, Issue 1, pp. 38-51 (Jan. + Feb. 2012).

Satoshi Iwaki et al., "Contactless Manipulation of an Object on a Plane Surface using Multiple Air Jets", 2011 IEEE International Conference on Robotics and Automation (ICRA), pp. 3257-3262 (May 2011).

Hiroo Iwata et al., "Project FEELEX: Adding Haptic Surface to Graphics", Proceedings of the 28th annual conference on Computer graphics and interactive techniques, p. 469-476, Aug. 2001.

Andrew Jones et al., "Rendering for an Interactive 360° Light Field Display", ACM Transactions on Graphics (TOG), vol. 26, No. 3, Jul. 2007.

Hidei Kimura et al., "True 3D Display", ACM SIGGRAPH 2011 Emerging Technologies, p. 1-1, Aug. 7-11, 2011, Vancouver, British Columbia, Canada.

Teruyuki Kozuka et al., "Noncontact Acoustic Manipulation in Air", Japanese Journal of Applied Physics, vol. 46, No. 7B, pp. 4948-4950 (2007).

Cha Lee et al., "Depth-Fused 3D Imagery on an Immaterial Display", IEEE Transactions on Visualization and Computer Graphics, vol. 15, No. 1, pp. 20-33, (Jan. 2009).

Jinha Lee et al., "ZeroN: Mid-Air Tangible Interaction Enabled by Computer Controlled Magnetic Levitation", Proceedings of the 24th annual ACM symposium on User interface software and technology, Oct. 16-19, 2011, Santa Barbara, California, USA.. pp. 327-336.

Ivan Poupyrev et al., "Lumen: Interactive Visual and Shape Display for Calm Computing", ACM SIGGRAPH 2004 Emerging technologies, Aug. 8-12, 2004, Los Angeles, California.

Ivan Poupyrev et al., "Actuation and Tangible User Interfaces: the Vaucanson Duck, Robots, and Shape Displays", Proceedings of the 1st international conference on Tangible and embedded interaction, Feb. 15-17, 2007, Baton Rouge, Louisiana.

Ismo Rakkolainen et al., "The Interactive FogScreen", ACM SIGGRAPH 2005 Emerging technologies, Jul. 31-Aug. 4, 2005, Los Angeles, California.

Rajinder Sodhi et al., "AIREAL: Interactive Tactile Experiences in Free Air", ACM Transactions on Graphics (TOG), vol. 32, Issue 4, (Jul. 2013).

Richard J.K. Weber et al., "Acoustic levitation: recent developments and emerging opportunities in biomaterials research" European Biophysics Journal, vol. 41, Issue 4, pp. 397-403 (2012).

Gordon Wetzstein et al., "Layered 3D: Tomographic Image Synthesis for Attenuation-based Light Field and High Dynamic Range Displays", ACM Transactions on Graphics (TOG), vol. 30, Issue 4 (Jul. 2011).

R.R. Whymark, "Acoustic field positioning for containerless processing", Ultrasonics, vol. 13, Issue 6, pp. 251-261 Nov. 1975).

W.J. Xie et al., "Acoustic method for levitation of small living animals", Applied Physics Letters, vol. 89, 214102-1-214102-3 (2006).

Michinari Kono et al., "lapillus bug: creature-like behaving particles based on interactive mid-air acoustic manipulation", In Proceedings of the 11th Conference on Advances in Computer Entertainment Technology (ACE '14). ACM, New York, NY, USA, Article 34.

W.L. Nyborg, "Radiation pressure on a small rigid sphere", Journal of Acoustical Society of America, vol. 42, pp. 947-952 (1967).

Yoichi Ochiai et al., Three-Dimensional Mid-Air Acoustic Manipulation by Ultrasonic Phased Arrays, PLOS One, May 21, 2014 (corrected), DOI: 10.1371/journal.pone.0097590.

Yoichi Ochiai et al., Pixie Dust: Graphics Generated by Levitated and Animated Objects in Computational Acoustic-Potential Field, ACM Transactions on Graphics (TOG)—Jul. 2014, vol. 333, Issue 4.

(56) References Cited

OTHER PUBLICATIONS

Takayuki Hoshi et al., Noncontact Tactile Display Based on Radiation Pressure of Airborne Ultrasound, IEEE Transactions on Haptics, Jul.-Sep. 2010, vol. 3, No. 3.
Seki Inoue, A Pinchable Aerial Virtual Sphere by Acoustic Ultrasound Stationary Wave, IEEE Haptics Symposium 2014, Feb. 23-26, 2014.
Benjamin Long et al., Rendering Volumetric Haptic Shapes in Mid-Air using Ultrasound, ACM Trans. Graph. 33, 6, Article 181, Nov. 2014.
L.P. Gorkov, On the Forces Acting on a Small Particle in an Acoustical Field in an Ideal Fluid, Soviet Physics-Doklady, Mar. 1962, pp. 773-775, vol. 6, No. 9, American Institute of Physics, New York.

* cited by examiner

Suspension

Animation

Distribution

Dot        Line

Cross

Triangle

Square

2D Grid

SYSTEM AND METHOD FOR MANIPULATING OBJECTS IN A COMPUTATIONAL ACOUSTIC-POTENTIAL FIELD

FIELD OF THE INVENTION

The present invention generally relates to three-dimensional acoustic manipulation of objects/particles. More particularly, the present invention relates to a system and a method by which the distribution of an acoustic-potential field is changed to levitate and animate objects/particles.

BACKGROUND

Throughout this application various publications are referred to by number in parentheses. Full citations for these references may be found at the end of the specification. The disclosures of these publications, and all patents, patent application publications and books referred to herein, are hereby incorporated by reference in their entirety into the subject application to more fully describe the art to which the subject invention pertains.

Interaction with real-world objects is a popular topic in research related to real-world-oriented interactive technologies. In the context of display technologies, analog installations with real objects are still very popular in many situations, such as window displays, shops, and museums.

Because of growing interest in the materialization of computer graphics, digital fabrication technologies have recently emerged as one of the most important application fields in real-world-oriented computer graphics. These technologies are rapidly expanding from research laboratories to commodity markets for personal use. Fabrication technologies bring computer graphics to the real world. However, two desirable functionalities in digital fabrication that are missing are the controllability of spatial position and animation. In the digital world, the spatial position of graphical models is freely controllable by merely setting the coordinates. The ability to do the same in the real world is also desirable for digital fabrication.

Two methods are currently available to control objects in the real world. In one such method, the objects actuate themselves. In the other method, the objects are actuated by their surroundings. This latter method is itself divided into two types of actuation techniques: a "contact" technique and a "non-contact" technique.

Among the available non-contact techniques are magnetic levitation, air jets, and other non-contact levitation technologies. However, these non-contact techniques suffer from various drawbacks, including a limitation on the materials that can be used with these techniques, an unsatisfactory refresh rate, and insufficient spatial resolution.

SUMMARY

In accordance with the embodiments of the present invention, the spatial position and three-dimensional animation of objects are controlled by utilizing a non-contact manipulation technology by which an acoustic-potential field ("APF") is created to effect the three-dimensional manipulation of the objects. Accordingly, real objects can be employed as graphical components, such as display pixels (static control) and vector graphics (dynamic control).

Furthermore, the use of an APF as the non-contact technique provides the following advantages as compared to magnetic levitation, air jets, and other non-contact levitation technologies: a wide variety of available materials can be used, a satisfactory refresh rate can be achieved, and sufficient spatial resolution can be provided.

Since the present invention provides an improvement in the ability to move fabricated models using non-contact manipulation, it contributes to computer graphics by allowing levitated objects to be used in graphical metaphors, such as the pixels of raster graphics, moving points of vector graphics, and animation. Accordingly, new avenues in the field of computer graphics will be opened. The present invention also provides an improvement in the ability to move objects using non-contact manipulation in applications other than computer graphics.

In accordance with an exemplary embodiment of the present invention, a method of generating an acoustic-potential field includes the steps of: generating a first common focal line of ultrasound using a first phased array of ultrasonic transducers and a second phased array of ultrasonic transducers to provide a first beam of standing waves between the first and the second phased arrays, wherein the first phased array and the second phased array are opposite each other along a first axis; and generating a second common focal line of ultrasound using a third phased array of ultrasonic transducers and a fourth phased array of ultrasonic transducers to provide a second beam of standing waves between the third and the fourth phased arrays, wherein the third phased array and the fourth phased array are opposite each other along a second axis that is perpendicular to the first axis.

In this exemplary method, the first and second beams of standing waves may overlap, and the first and second beams of standing waves may be perpendicular to each other.

The step of generating the first common focal line may include the step of targeting a separate focal point with each column of ultrasonic transducers of the first phased array in accordance with the equation $\Delta t_{ij}=(l_{0j}-l_{ij})/c$, wherein $\Delta t_{ij}$ represents a time delay for the application of a drive signal to an ultrasonic transducer in a column of ultrasonic transducers relative to the application of a drive signal to a reference ultrasonic transducer for that column, $l_{0j}$ represents a distance from the focal point targeted by that column of ultrasonic transducers to the reference transducer for that column, $l_{ij}$ represents the distance from the focal point targeted by that column to a non-reference ultrasonic transducer for that column, and c represents the speed of sound in air.

The step of generating the first common focal line may further include the step of targeting a separate focal point for each column of ultrasonic transducers of the second phased array in accordance with the equation $\Delta t_{ij}=(l_{0j}-l_{ij})/c$, wherein the focal point targeted by a column of the second phased array corresponds to the focal point targeted by the opposing column of the first phased array.

The step of generating the second common focal line may include the step of generating a separate focal point with each column of ultrasonic transducers of the third phased array in accordance with the equation $\Delta t_{ij}=(l_{0j}-l_{ij})/c$, wherein $\Delta t_{ij}$ represents a time delay for the application of a drive signal to an ultrasonic transducer in a column of ultrasonic transducers relative to the application of a drive signal to a reference ultrasonic transducer for that column, $l_{0j}$ represents a distance from the focal point targeted by that column of ultrasonic transducers to the reference transducer for that column, $l_{ij}$ represents the distance from the focal point targeted by that column to a non-reference ultrasonic transducer for that column, and c represents the speed of sound in air.

The step of generating the second common focal line may further include the step of targeting a separate focal point with each column of ultrasonic transducers of the fourth phased array in accordance with the equation $\Delta t_{ij}=(l_{0j}-l_{ij})/c$, wherein the focal point targeted by a column of the fourth phased array corresponds to the focal point targeted by the opposing column of the third phased array.

In another exemplary embodiment in accordance with the present invention, an acoustic-potential field generator includes: a first phased array of ultrasonic transducers; a second phased array of ultrasonic transducers disposed opposite the first phased array along a first axis, the first and second phased arrays together generating a first common focal line of ultrasound at a first position to provide a first beam of standing waves between the first and the second phased arrays; a third phased array of ultrasonic transducers; and a fourth phased array of ultrasonic transducers disposed opposite the third phased array along a second axis that is perpendicular to the first axis, the third and fourth phased arrays generating a second common focal line of ultrasound at a second position to provide a second beam of standing waves between the third and the fourth phased arrays.

In this exemplary acoustic-potential field generator, the first and second beams of standing waves may overlap, the first and second beams of standing waves may be perpendicular to each other.

The first phased array may include a plurality of columns of ultrasonic transducers; and each column of ultrasonic transducers in the first phased array targets a separate focal point of the first common focal line in accordance with the equation $\Delta t_{ij}=(l_{0j}-l_{ij})/c$, wherein $\Delta t_{ij}$ represents a time delay for the application of a drive signal to an ultrasonic transducer in each column of ultrasonic transducers relative to the application of a drive signal to a reference ultrasonic transducer in that column, $l_{0j}$ represents a distance from the focal point targeted by that column of ultrasonic transducers to the reference ultrasonic transducer for that column, $l_{ij}$ represents the distance from the focal point targeted by that column to a non-reference ultrasonic transducer for that column, and c represents the speed of sound in air.

The second phased array may include a plurality of columns of ultrasonic transducers; and each column of ultrasonic transducers in the second phased array targets a separate point of the first common focal line in accordance with the equation $\Delta t_{ij}=(l_{0j}-l_{ij})/c$, wherein the focal point targeted by a column of the second phased array corresponds to the focal point targeted by the opposing column of the first phased array.

The third phased array may include a plurality of columns of ultrasonic transducers; and each column of ultrasonic transducers in the third phased array targets a separate focal point of the second common focal line in accordance with the equation $\Delta t_{ij}=(l_{0j}-l_{ij})/c$, wherein $\Delta t_{ij}$ represents a time delay for the application of a drive signal to an ultrasonic transducer in each column of ultrasonic transducers relative to the application of a drive signal to a reference ultrasonic transducer in that column, $l_{0j}$ represents a distance from the focal point targeted by that column of ultrasonic transducers to the reference ultrasonic transducer for that column, $l_{ij}$ represents the distance from the focal point targeted by that column to a non-reference ultrasonic transducer for that column, and c represents the speed of sound in air.

The fourth phased array may include a plurality of columns of ultrasonic transducers; and each column of ultrasonic transducers in the fourth phased array targets a separate point of the second common focal line in accordance with the equation $\Delta t_{ij}=(l_{0j}-l_{ij})/c$, wherein the focal point targeted by a column of the fourth phased array corresponds to the focal point targeted by the opposing column of the third phased array.

In accordance with yet another embodiment in accordance with the present invention, a method of generating a graphics display includes the steps of: receiving coordinates of a first target point; generating a first common focal line of ultrasound using a first phased array of ultrasonic transducers and a second phased array of ultrasonic transducers to provide a first beam of standing waves between the first and the second phased arrays in a vicinity of the first target point, wherein the first phased array and the second phased array are opposite each other along a first axis; generating a second common focal line of ultrasound using a third phased array of ultrasonic transducers and a fourth phased array of ultrasonic transducers to provide a second beam of standing waves between the third and the fourth phased arrays in the vicinity of the first target point, wherein the third phased array and the fourth phased array are opposite each other along a second axis that is perpendicular to the first axis; generating an acoustic-potential field corresponding to the coordinates of the first target point, the acoustic-potential field having a two-dimensional arrangement of local minima; and suspending objects in the local minima of the acoustic-potential field.

In this exemplary method, the step of generating the first common focal line may include the step of targeting a separate focal point with each column of ultrasonic transducers of the first phased array in accordance with the equation $\Delta t_{ij}=(l_{0j}-l_{ij})/c$, wherein $\Delta t_{ij}$ represents a time delay for the application of a drive signal to an ultrasonic transducer in a column of ultrasonic transducers relative to the application of a drive signal to a reference ultrasonic transducer for that column, $l_{0j}$ represents a distance from the focal point targeted by that column of ultrasonic transducers to the reference transducer for that column, $l_{ij}$ represents the distance from the focal point targeted by that column to a non-reference ultrasonic transducer for that column, and c represents the speed of sound in air.

The step of generating the first common focal line may further include the step of targeting a separate focal point for each column of ultrasonic transducers of the second phased array in accordance with the equation $\Delta t_{ij}=(l_{0j}-l_{ij})/c$, wherein the focal point targeted by a column of the second phased array corresponds to the focal point targeted by the opposing column of the first phased array.

The step of generating the second common focal line may include the step of generating a separate focal point with each column of ultrasonic transducers of the third phased array in accordance with the equation $\Delta t_{ij}=(l_{0j}-l_{ij})/c$, wherein $\Delta t_{ij}$ represents a time delay for the application of a drive signal to an ultrasonic transducer in a column of ultrasonic transducers relative to the application of a drive signal to a reference ultrasonic transducer for that column, $l_{0j}$ represents a distance from the focal point targeted by that column of ultrasonic transducers to the reference transducer for that column, $l_{ij}$ represents the distance from the focal point targeted by that column to a non-reference ultrasonic transducer for that column, and c represents the speed of sound in air.

The step of generating the second common focal line may further comprise the step of targeting a separate focal point with each column of ultrasonic transducers of the fourth phased array in accordance with the equation $\Delta t_{ij}=(l_{0j}-l_{ij})/c$, wherein the focal point targeted by a column of the fourth phased array corresponds to the focal point targeted by the opposing column of the third phased array.

This exemplary method may further include the steps of: receiving coordinates of a second target point; generating the first common focal line of ultrasound to provide the first beam of standing waves in a vicinity of the second target point; generating the second common focal line of ultrasound to provide the second beam of standing waves in a vicinity of the second target point; generating an acoustic-potential field corresponding to the coordinates of the second target point, the acoustic-potential field having a two-dimensional arrangement of local minima; and suspending the objects in the local minima of the acoustic-potential field corresponding to the coordinates of the second target point.

The method may further include the step of moving the suspended objects from the spatial positions of the local minima in the acoustic-potential field corresponding to the coordinates of the first target point to the spatial positions of the local minima in the acoustic-potential field corresponding to the coordinates of the second target point. The moving step may include moving the suspended objects together. The moving step may also include moving the suspended objects in a plane parallel to the plane of the first target point or in a plane perpendicular to the plane of the first target point. The moving step may also include moving the suspended objects at a speed that produces an effect of persistence of vision.

The method may provide a vector graphics display, a projection screen, or a raster display.

In accordance with still another embodiment in accordance with the present invention, a method of generating an acoustic-potential field includes the steps of: receiving holographic information representative of a desired acoustic-potential field; identifying one or more focal points based on the holographic information; determining phase information between each focal point and each transducer of a phased array of ultrasonic transducers; and using the phase information to generate ultrasonic waves from the phased array of ultrasonic transducers to form standing waves at the focal point.

In this exemplary method, the one or more focal points may be provided at arbitrary positions in three-dimensional space, and the standing waves may be formed in three dimensions.

The method may further include the step of suspending objects in nodes of the standing waves. The method may even further include the step of visualizing the desired acoustic-potential field, which may be accomplished by suspending objects in the nodes of the standing waves.

The method may further involve a plurality of phased arrays of ultrasonic transducers, and may further include the steps of: orienting the holographic information relative to the spatial position of each phased array of ultrasonic transducers so that the desired acoustic-potential field is aligned; identifying the one or more focal points based on the oriented holographic information for each phased array of ultrasonic transducers; determining the phase information between each focal point and each transducer of each phased array of ultrasonic transducers; and using the phase information to generate ultrasonic waves from each phased array of ultrasonic transducers to form standing waves at each focal point.

BRIEF DESCRIPTION OF THE DRAWINGS

Various exemplary embodiments of this invention will be described with reference to the following figures, wherein.

DETAILED DESCRIPTION

Figure 1A:
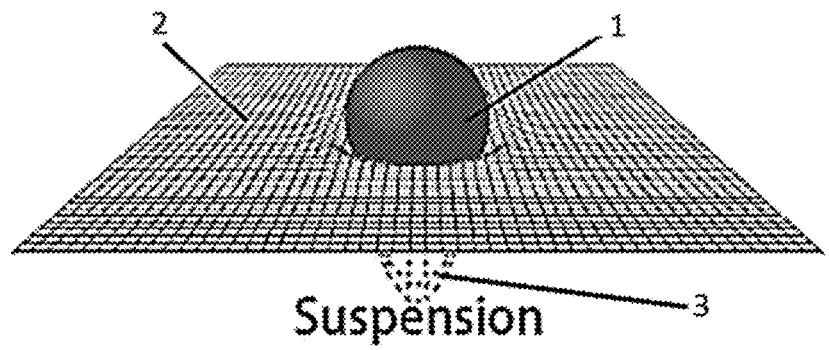
FIG. 1A shows the suspension of a levitated object in a potential field.

In accordance with the embodiments of the present invention disclosed and described herein, real (i.e., physical) objects/particles are digitally controlled in mid-air, i.e., the objects/particles are suspended and moved in mid-air without physical support, such as posts, rods, or strings. (In the following description, the terms "object" and "particle" are used synonymously.)

Controlling objects in the real world is a popular topic in the computer graphics ("CG") and human-computer interaction ("HCI") communities. Various ideas to realize this control have been proposed—e.g., programmable matter (7), radical atoms (13), actuation interfaces (31), and smart material interfaces (25). These proposals focus on controlling real objects through a computer and generating physically programmable material. These concepts expand the range of graphics from "painted bits" to the real world (12).

Several related studies have aimed at noncontact manipulation in the context of interactive techniques. For example, it has been proposed to manipulate a three-dimensional object by controlling a magnetic field and using it as a floating screen and an input user interface (22). The levitated object is limited to a single magnetic sphere in this proposal. Noncontact manipulation can be also achieved by using air-jets, i.e., an airflow field (14). While this research is limited to two-dimensional manipulation, it can be extended to three-dimensional manipulation. It may be possible to use air-cannons in a similar manner (33).

Sound can also be utilized to manipulate objects in air. Both standing waves (acoustic levitation/manipulation) and traveling waves (23) are available to be used. Acoustic manipulation has been extended to three-dimensional manipulation of objects (28). A summary of these manipulation methods is shown in Table 1.

TABLE 1

Comparative table of manipulation methods.

| Physical quantity | Material parameters | Mechanism | Spatial resolution |
|---|---|---|---|
| Sound | Density & volume | Ultrasonic transducers | Wavelength |
| Airflow (14) | Density & surface area | Air jets | Spread of air jets |
| Magnetism (22) | Weight & magnetism | Electromagnet & XY stage | Size of magnet |

Figure 1B:
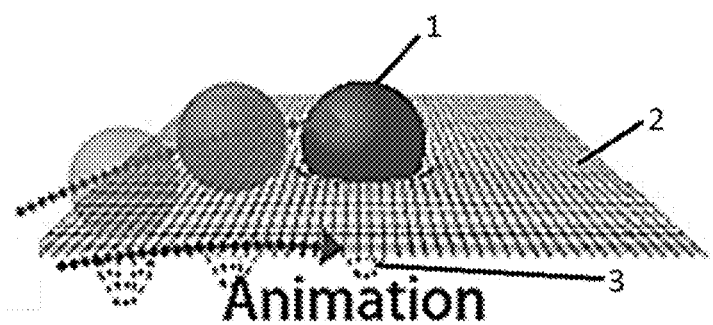
FIG. 1B shows the animation of a levitated object in a potential field.
Figure 1C:
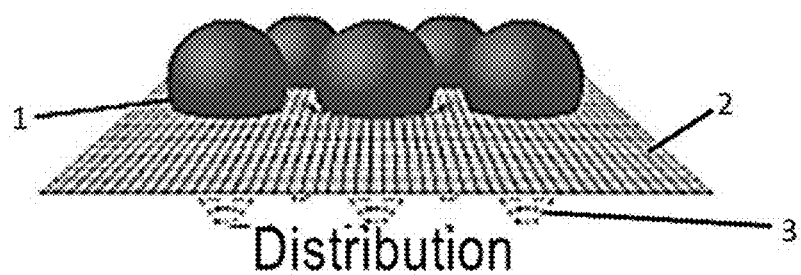
FIG. 1C shows the distribution of levitated objects in a potential field.

Conventional studies on non-contact levitation/manipulation are based on "potential fields" that are determined by various physical quantities, such as sound pressure in acoustic levitation and magnetic fields in magnetic levitation (2). As used herein, the term "potential field" means a scalar field that gives a force vector field working on a given object. As shown in FIGS. 1A-1C, levitated objects 1 can be manipulated by controlling the potential field 2 spatially and temporally so that the objects are trapped in the nodes 3 (i.e., local minima) of the potential field and are moved (i.e., animated) to different local minima 3 within the potential field.

When the potential field is controlled by a computer, it is referred to herein as a computational potential field ("CPF"). Accordingly, a CPF is defined as a potential field that is determined by some physical quantities controlled by a computer and that can suspend and move objects in the real world. Thus, CPFs can be thought of as "invisible strings" used to manipulate real objects. In these implementations, the objects have no actuators and only float in the air in accordance with the spatiotemporal changes of the CPF. The concept of a CPF is useful to not only explain various noncontact forces (such as acoustic, magnetic, and pneumatic) in a unified manner, but also to serve as a platform for discussing and designing noncontact manipulation in the future. This provides freedom from specific physical parameters, such as sound pressure, magnetism, and airflow, and allows for discussions based on the divergence, the rotation, the response speed, and the wave/diffusion characteristics of the CPF.

Several studies have been conducted on manipulation using ultrasonic waves. For example, acoustic radiation pressure of traveling waves from surrounding ultrasonic-phased arrays have been used to demonstrate two-dimensional manipulation of lightweight spherical objects (23). Another method—acoustic levitation/manipulation—utilizes ultrasonic standing waves. A bolted Langevin transducer ("BLT") is used together with a reflector to trap objects in water and levitate them in air (19, 38). Opposite BLTs have been used to manipulate objects in a one-dimensional direction along the acoustic beam (19, 35). A transducer array and a reflector plate have been used to move an object along a two-dimensional plane (6, 18).

Figure 2:
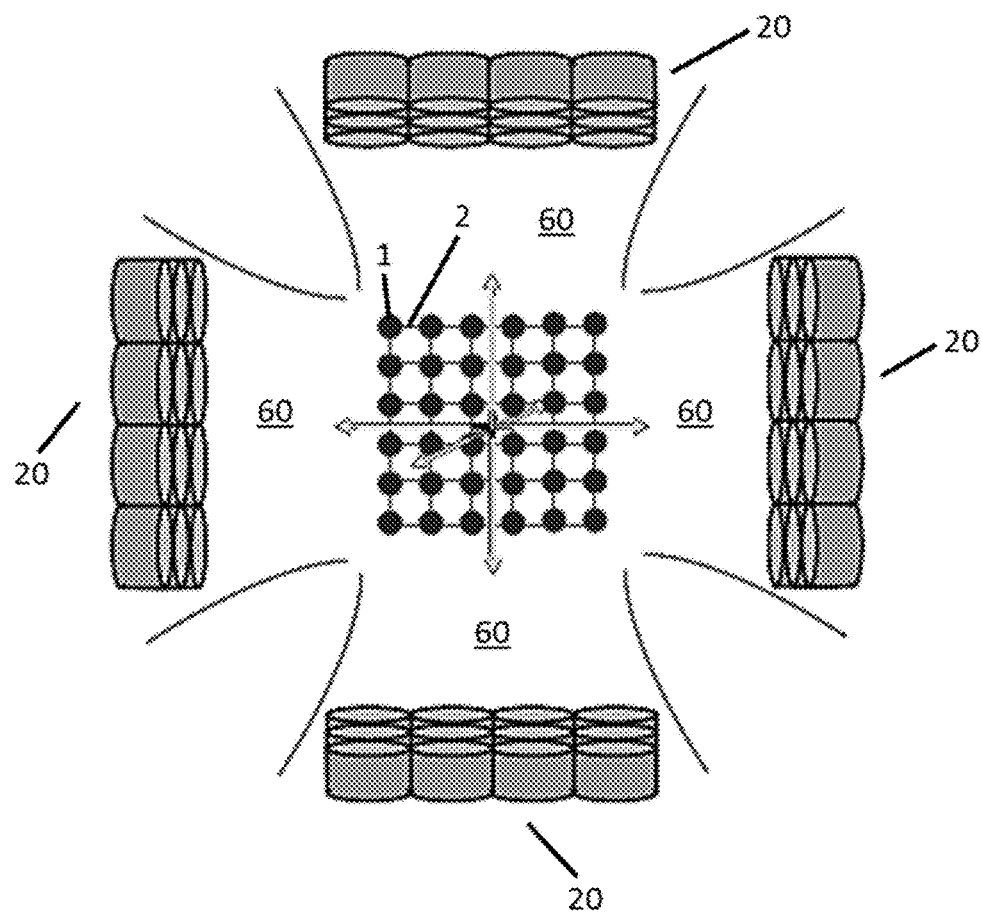
FIG. 2 shows a three-dimensional acoustic potential field in accordance with the embodiments of the present invention.

Extended acoustic manipulation with opposite transducer arrays has been shown to move objects in a three-dimensional space (28). In accordance with the embodiments of the present invention, there is provided a system and a method in which the state of the art in three-dimensional acoustic manipulation has been extended and has been applied to the fields of CG and HCI. In contrast to conventional systems and methods, the shape of the acoustic beams is controlled in the embodiments in accordance with the present invention. Furthermore, multiple objects can be levitated and manipulated together in a three-dimensional space in the embodiments in accordance with the present invention. Still further, a dot-matrix display can be made in mid-air in the embodiments in accordance with the present invention. These features of the present invention are depicted in FIG. 2, which shows levitated objects in an acoustic-potential field 2 generated by acoustic beams 60 provided by an arrangement of ultrasonic phased arrays 20.

Many image-projection technologies have been investigated, including using fog as a screen (21,32) and using dust-like particles as a screen (29). These technologies display images in air by utilizing the diffusion property of fog and dust. Another proposal involves a screen that uses falling water drops in air (1). Utilizing their lens-like property, images are able to be projected onto the water drops. Multilayer water-drop screens are created in air, and images corresponding to the spatial position of the water drops are projected by synchronizing the projector with the water bulbs. A passive floating display using water, which is a display that is aimed to realize an ambient display, has also been disclosed (9). In contrast to these conventional approaches, the embodiments in accordance with the present invention differ with regard to the spatial control and selectivity of the available materials in a mid-air screen, and can expand on these conventional, passive-screen approaches.

Studies directed toward controlling the spatial position of an active screen and display are also being actively pursued. There are two kinds of the studies; one aims to achieve a multi-perspective, three-dimensional image, and the other aims to realize deformation of planar screens for haptic and/or other purposes. Multi-perspective 3D display is a popular topic in computational display areas. From the viewpoint of a volumetric display, the following approaches have been disclosed: constructing three-dimensional images with a rotated mirror and projection (16), achieving three-dimensional images by rotating a vertical diffuser plate and projection (4), and a glasses-free light field display using volumetric attenuators (36). On the other hand, there have also been studies that focus on a dynamic deformable screen and display. For example, the deformable actuated screen "Project FEELEX" (15) constructs 3D forms on the screen surface using an actuator array set under the screen. LUMEN (30) is comprised of actuated dot-matrix light-emitting diode (LED)—physical pixels showing RGB and H (height). An interactive deformable screen, called "inForm" (5), handles and/or interacts with other objects. A non-contact-actuated deformable screen employs an ultrasonic-phased array to deform a colloidal screen (27). The embodiments in accordance with the present invention differ from these conventional screens and displays in that the embodiments in accordance with the present invention allow for three-dimensional manipulation and levitation. Moreover, the embodiments in accordance with the present invention can use various materials as volumetric pixels. While there has been disclosed a three-dimensional solution that uses a three-dimensional volumetric plasma display (17), the embodiments in accordance with the present invention differ from the conventional three-dimensional plasma display since the volumetric pixels in the embodiments in accordance with the present invention can be touched by a user.

Figure 3:
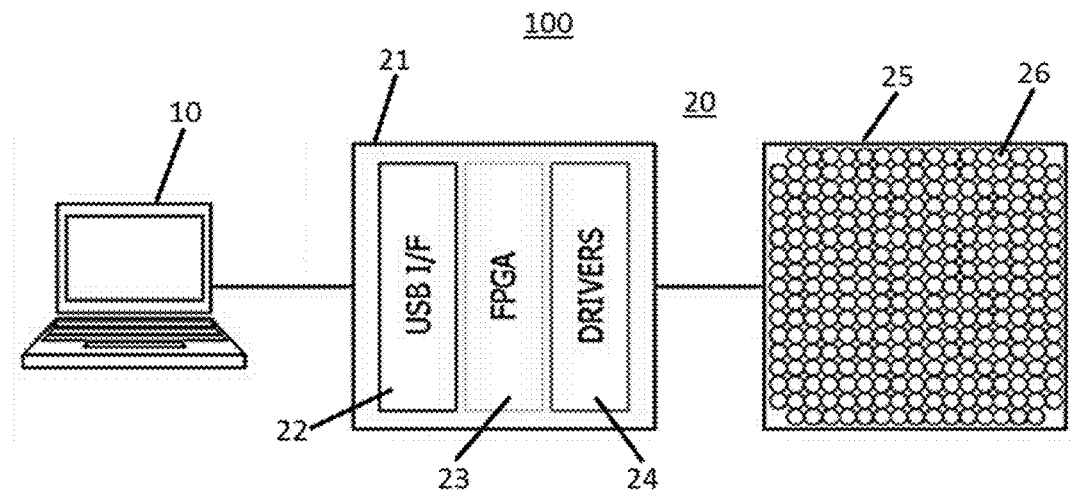
FIG. 3 shows a system for manipulating objects in an acoustic-potential field in accordance with an embodiment of the present invention.

FIG. 3 shows an exemplary embodiment of a system 100 in accordance with the present invention. The system 100 includes a personal computer ("PC") 10 and one or more ultrasonic phased arrays 20. The PC 10 controls each one of the ultrasonic phased arrays 20 via a USB cable 30.

In a preferred embodiment, the size and weight of a single phased array 40 are 19×19×5 cm³ and 0.6 kg, respectively. Each phased array 20 consists of two circuit boards 21, 25.

The first circuit board is an array 25 of ultrasonic transducers 26. The second circuit board contains the driving circuitry 21 which drives the ultrasonic transducers 26. The driving circuitry 21 includes a USB interface circuit 22, a field-programmable gate array FPGA 23, and drivers 24. The two circuit boards—and hence the transducer array 25 and the driving circuitry 21—are connected to each other with pin connectors 40.

Figure 4:
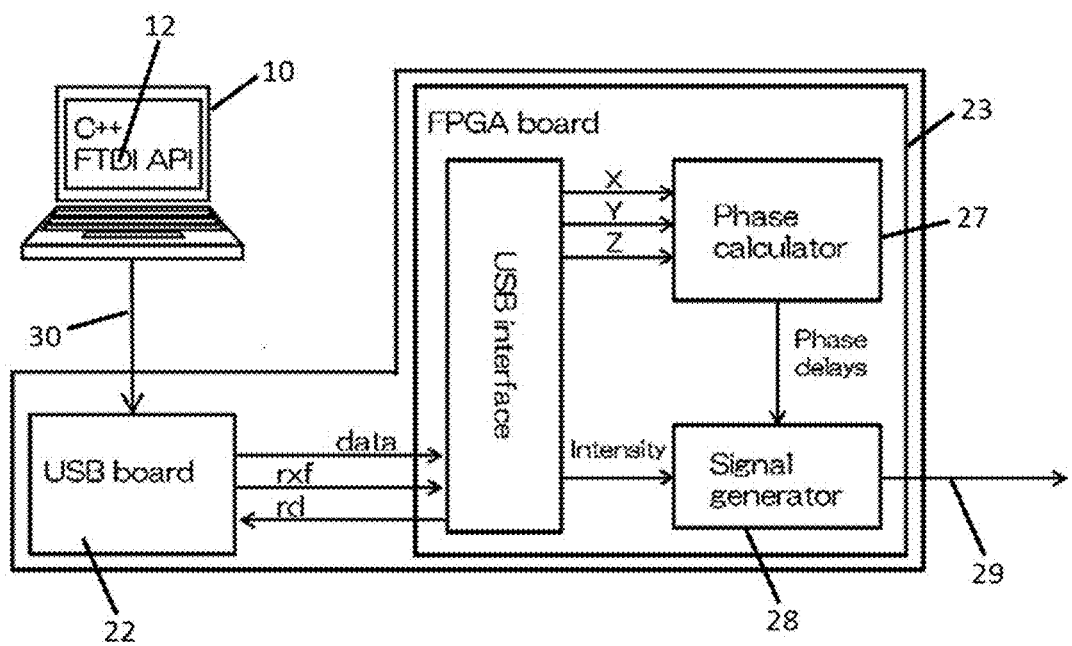
FIG. 4 shows the system of FIG. 3 in additional detail.

Referring to FIG. 4 as well, the USB interface 22 of the driving circuit may be implemented by a USB board that employs an FT2232H Hi-Speed Dual USB UART/FIFO integrated circuit manufactured by Future Technology Devices International Ltd. of Glasgow, UK. The FPGA 23 may be implemented by an FPGA board that includes a Cyclone III FPGA manufactured by Altera Corp. of San Jose, Calif. The drivers 24 may be implemented using push-pull amplifier ICs.

Figure 5:
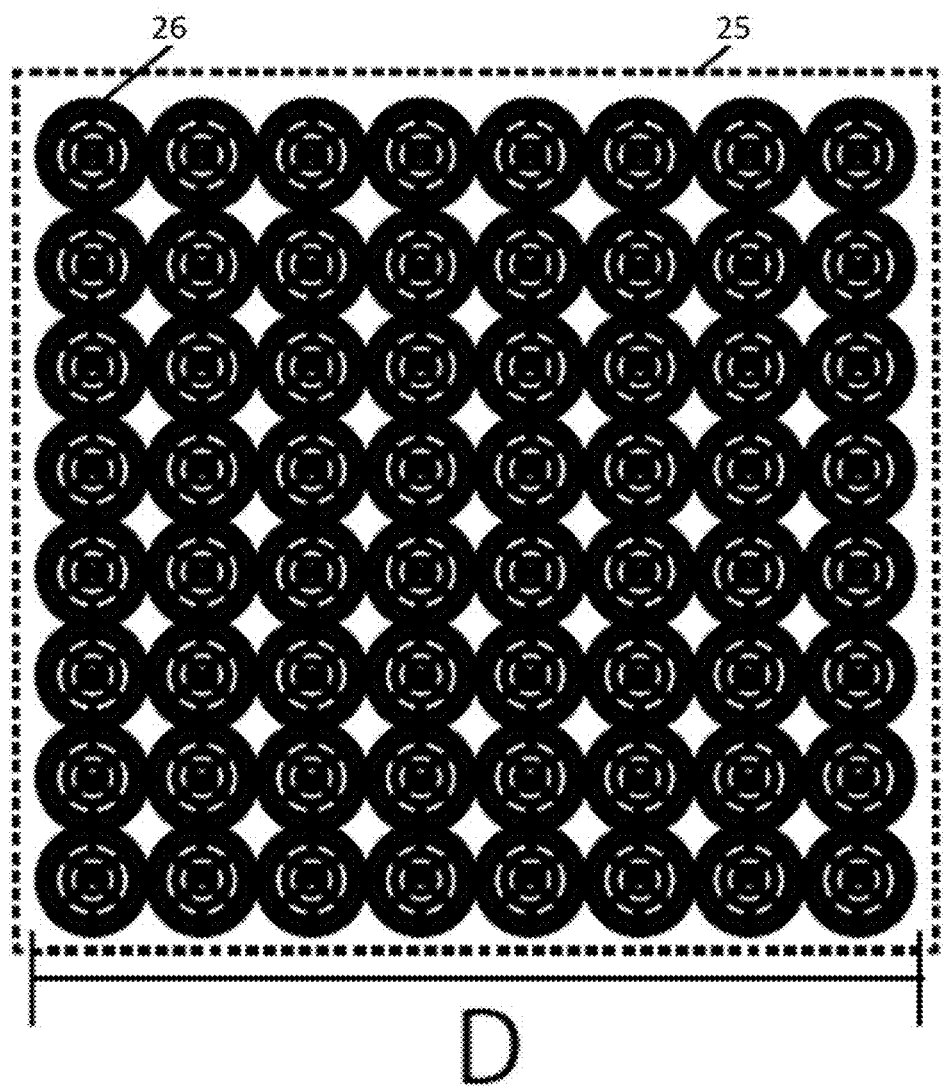
FIG. 5 shows an ultrasonic phased array in accordance with the embodiments of the present invention.

As shown in FIG. 5, each array 25 of ultrasonic transducers 26 has a side length D and has hundreds of ultrasonic transducers 26, each of which is controlled separately with an adequate time delay or phase delay that is specified by the PC 10 and is applied by the driving circuitry 21. In this way, each array 25 of ultrasonic transducers 26 generates a single focal point or other distributions of ultrasound (e.g., multiple focal points and a focal line) to levitate and manipulate small particles.

Figure 6:
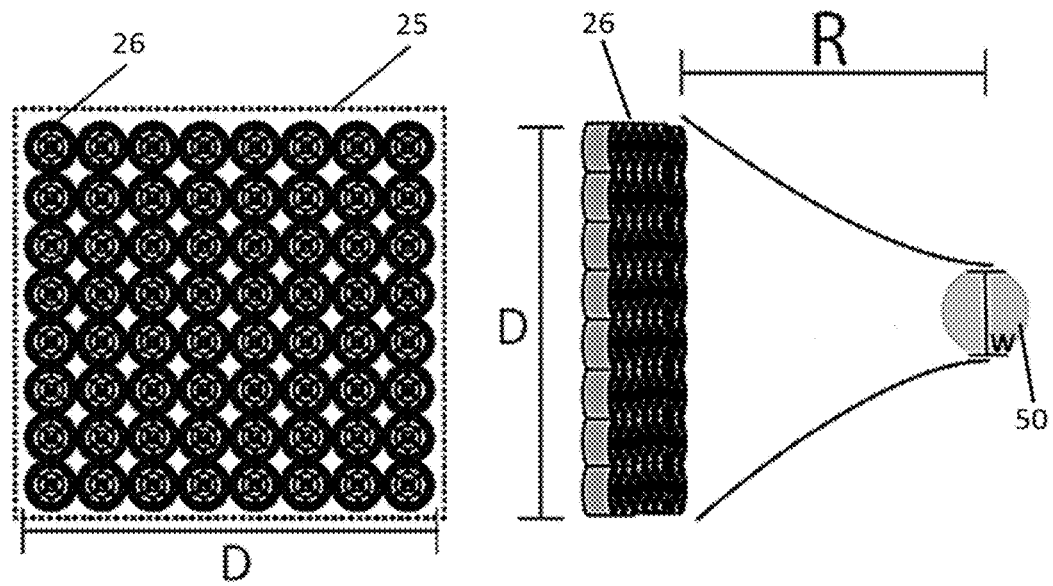
FIG. 6 shows the generation of a focal point by an ultrasonic phased array in accordance with the embodiments of the present invention.

Referring to FIG. 6, a focal point 50 of ultrasound is generated as follows. The time delay $\Delta t_{ij}$ for the (i, j)-th transducer 26 of transducer array 25 is given by:

$$\Delta t_{ij} = (l_{00} - l_{ij})/c \quad (1)$$

where $l_{00}$ and $l_{ij}$ are the distances from the focal point to the (0,0)-th (reference) and the (i, j)-th transducers 26, respectively. The speed of sound in air is c. The focal point 50 can be moved by recalculating and setting the time delays for the coordinates of its next target location.

It has been theoretically and experimentally shown that the spatial distribution of ultrasound generated from a rectangular transducer array is nearly sinc-function-shaped (10). The width of the main lobe w parallel to the side of the rectangular array is written as $$w = \frac{2\lambda R}{D} \quad (2)$$

where λ is the wavelength, R is the focal length and D is the length of the side of the rectangular array. Eq. (2) implies that there is a trade-off between spatial resolution and the array size.

Figure 7:
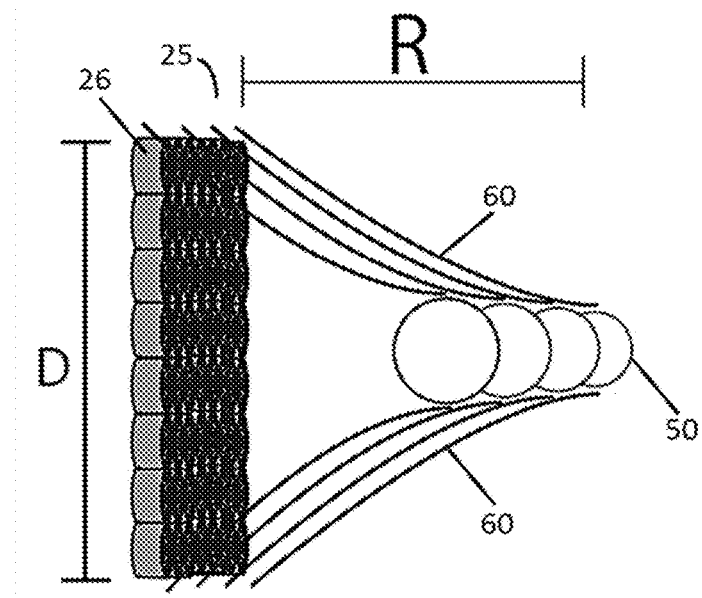
FIG. 7 shows the generation of a focal line by an ultrasonic phased array in accordance with the embodiments of the present invention.

Referring to FIG. 7, a focal line of an ultrasound is generated in a similar manner with variation in the target coordinates. In this case, the time delay $\Delta t_{ij}$ for the (i, j)-th transducer 26 in array 25 is given by:

$$\Delta t_{ij} = (l_{0j} - l_{ij})/c \quad (3)$$

where $l_{0j}$ and $l_{ij}$ are the distances from the j-th focal point to the (0,j)-th and the (i, j)-th transducers 26, respectively, i.e., each column targets its own focal point 50. The thickness of the focal line is w, as defined in Eq. (2) above. The peak value of the amplitude of the focal line is lower than that of the focal point because the acoustic energy is distributed over a broader area.

The principle of acoustic levitation has been explained mathematically (8, 26). When a small sphere is in an acoustic field, the potential energy U of an ultrasonic standing wave is expressed as $$U = B\langle K_a \rangle + (1-\gamma)\langle P_a \rangle \quad (4)$$

$K_a$ and $P_a$ in Eq. (4) are the kinetic and potential energy densities of ultrasound, respectively. $\langle \rangle$ is the time average. B is given by $3(\rho-\rho_0)/(2\rho+\rho_0)$, where $\rho$ and $\rho_0$ are the densities of a small sphere and the medium, respectively. $\gamma$ is given by $\beta/\beta_0$ where $\beta$ and $\beta_0$ are the compression ratios of the small sphere and the medium, respectively. The force F acting on a sphere of volume V is given by $F=-V\nabla U$.

Figure 8:
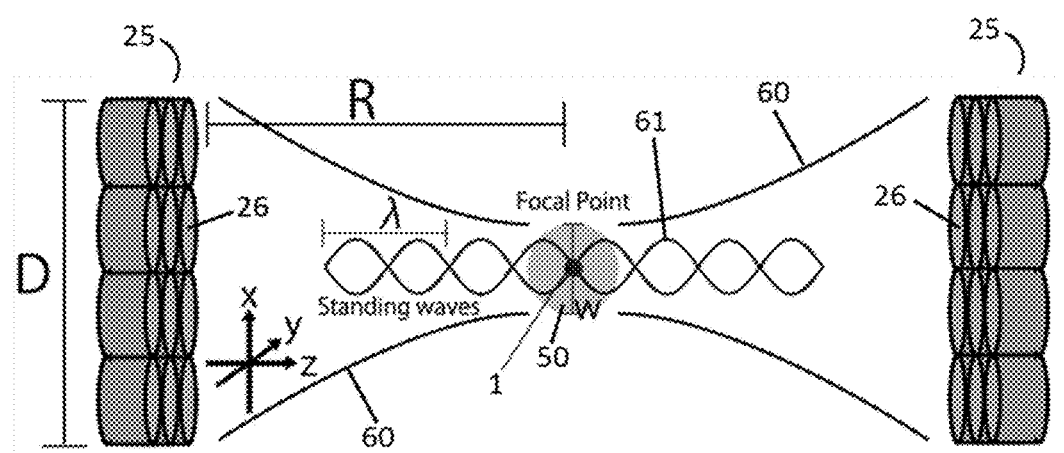
FIG. 8 shows a narrow beam of standing wave generated in the vicinity of a focal point in accordance with the embodiments of the present invention.

Next, the potential fields for a focal point and a focal line are described. Referring to FIG. 8, a narrow beam of standing wave 61 is generated in the vicinity of a focal point 50 when two transducer arrays 25 are set opposite each other and generate the common focal point 50 with their acoustic beams 60. The length of the standing wave depends on the focal depth.

An ultrasonic standing wave along the z-axis is assumed. Its sound pressure p is written as $$p = \sqrt{2} A g(x, y) \cos\left(\frac{2\pi z}{\lambda}\right) e^{-j\omega t} \quad (5)$$

where A is the root mean square (RMS) amplitude, $g(x, y)$ is the normalized cross-sectional distribution of the ultrasonic beam, and $\omega$ is the angular velocity. By definition, $K_a \equiv \rho u^2$ and $P_a = p^2/2\rho c^2$ where u is the particle velocity. In the beam of standing wave, $u = (1/\rho c)(\partial p/\partial z)$. Then, U is written as $$U = g(x, y)^2 \frac{A^2}{\rho_0 c^2}\left\{-B + (B + 1 - \gamma)\cos^2\left(\frac{2\pi z}{\lambda}\right)\right\} \quad (6)$$

As mentioned above, it has been theoretically determined that the distribution of the focal point $g(x, y)$ generated by a rectangular transducer array can be approximated by a sinc function (10):

$$(x, y) \simeq \text{sinc}\left(\frac{2\pi x}{w}, \frac{2\pi y}{w}\right) \quad (7)$$

where the two-dimensional sinc function $\text{sinc}(x, y)$ is defined as $\sin(x)\sin(y)/xy$.

Figure 9:
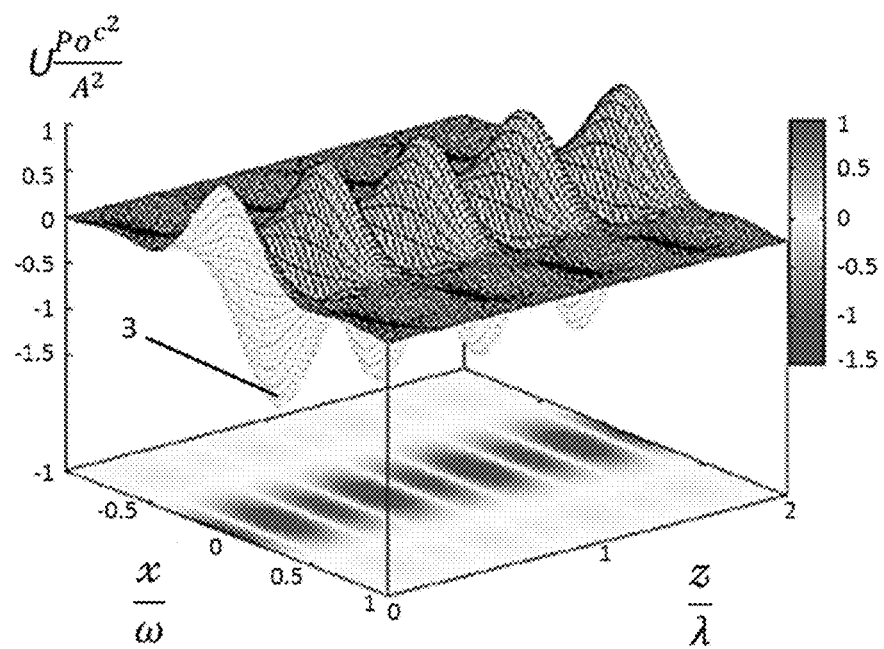
FIG. 9 shows a potential field in the vicinity of the focal point of an ultrasonic beam.

FIG. 9 shows the potential energy distribution based on Eqs. (6) and (7) for y=0. It is assumed here that the sphere is made of polystyrene and the medium is air. Hence, $\rho=1\times10^3$ kg/m$^3$, $\rho_0=1.2$ kg/m$^3$, $\beta=2.5\times10^{-10}$ Pa$^{-1}$, and $\beta_0=7.1\times10^{-6}$ Pa$^{-1}$. The polystyrene spheres will gravitate toward the acoustic axis of the ultrasound beam at its nodes 3.

In accordance with an embodiment of the present invention, the one or more ultrasonic phased arrays 20 together form an acoustic-potential field generator. In a presently preferred embodiment of system 100, four phased arrays 20 are arranged facing each other. A "workspace" formed by this arrangement of the four phased arrays 20 is 520×520 mm$^2$.

In such an arrangement of the four phased arrays 20, a sheet beam of standing wave is generated in the vicinity of a focal point when the four phased arrays 20 surround the workspace and generate focal lines at the same position. Such an acoustic field is described as two beams of standing waves that overlap perpendicular to each other.

Assuming an ultrasonic standing wave parallel to the x and z axes, its sound pressure p is written as:

$$p = \sqrt{2} A \text{sinc}\left(\frac{2\pi y}{w}\right)\left\{\cos\left(\frac{2\pi x}{w}\right) + \cos\left(\frac{2\pi z}{w}\right)\right\} e^{-j\omega t} \quad (8)$$

Then, U is written as:

$$U = \text{sinc}^2\left(\frac{2\pi y}{w}\right)\frac{A^2}{\rho_0 c^2} \quad (9)$$

$$\left\{-B\left[\sin^2\left(\frac{2\pi x}{\lambda}\right) + \sin^2\left(\frac{2\pi z}{\lambda}\right)\right] + (1-\gamma)\left[\cos\left(\frac{2\pi x}{\lambda}\right) + \cos\left(\frac{2\pi z}{\lambda}\right)\right]^2\right\}$$

Figure 10:
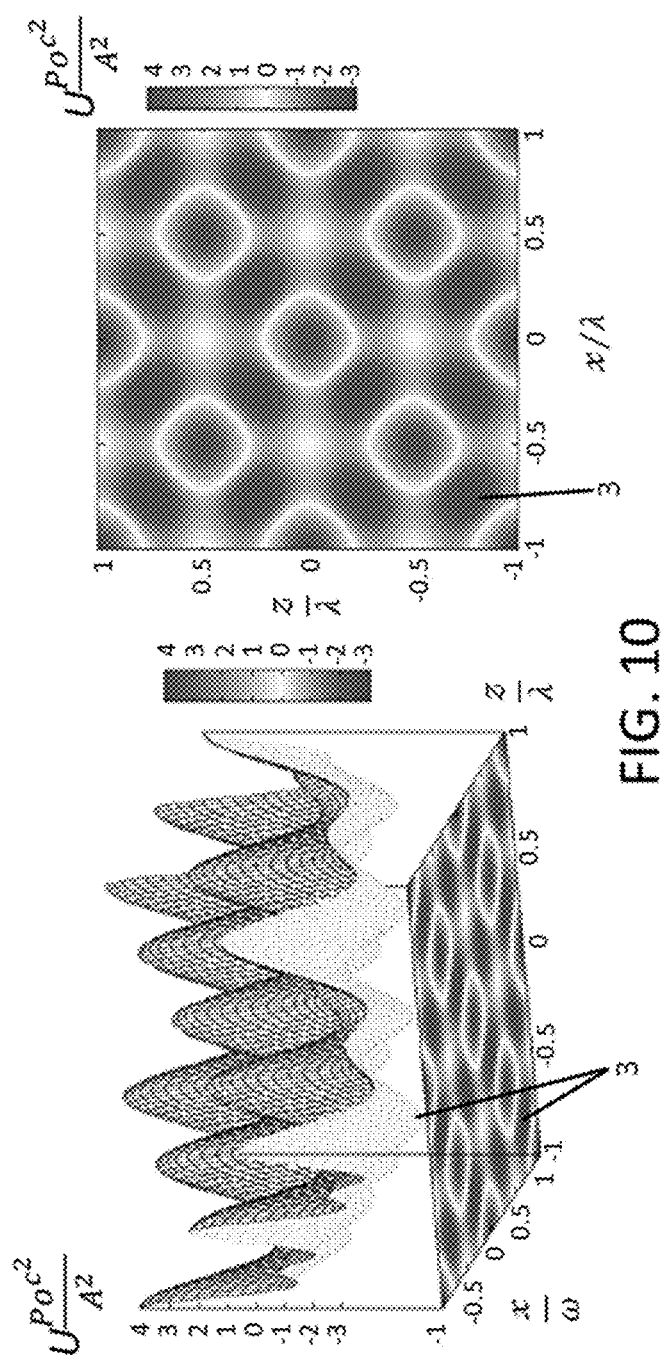
FIG. 10 is shows a potential field in the vicinity of an intersection of ultrasonic beams.

FIG. 10 shows the potential energy distribution based on Eq. (9) for y=0. It is again assumed that that the sphere is made of polystyrene and the medium is air. Hence, $\rho=1\times10^3$ kg/m$^3$, $\rho_0=1.2$ kg/m$^3$, $\beta=2.5\times10^{-10}$ Pa$^{-1}$, and $\beta_0=7.1\times10^{-6}$ Pa$^{-1}$. The potential field shown in FIG. 10 has equally spaced local minima. This field distribution is used to create a dot matrix of small objects that are held in the local minima 3 of the field distribution.

Figure 11:
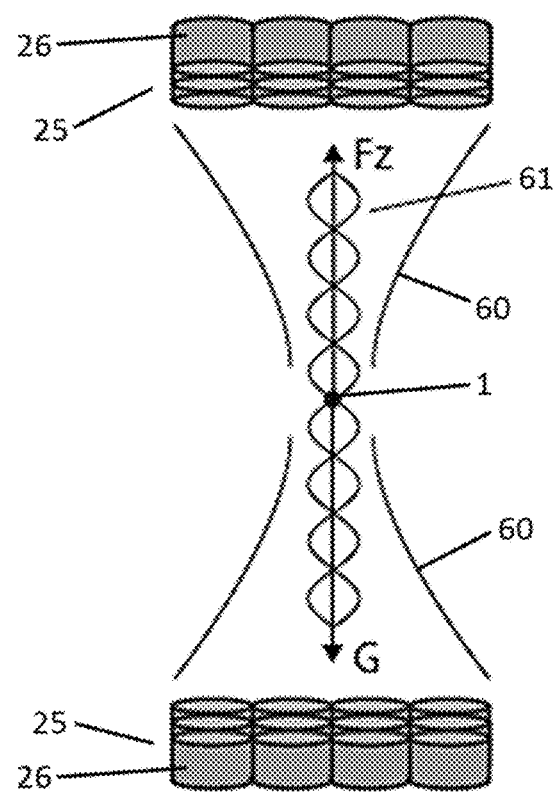
FIG. 11 shows an axial suspending force in accordance with the embodiments of the present invention.
Figure 12:
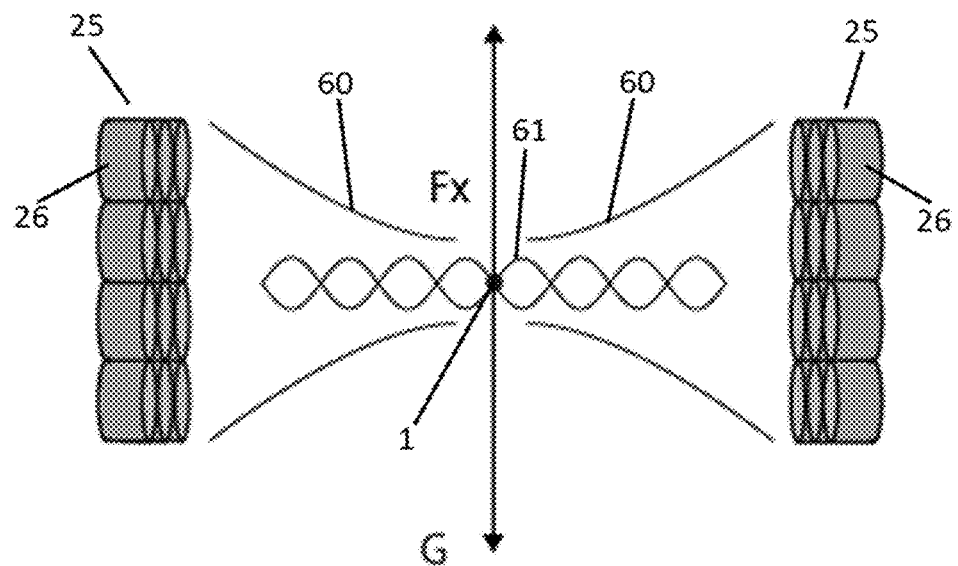
FIG. 12 shows a radial suspending force in accordance with the embodiments of the present invention.

The intensity of the suspending force depends on the direction of the acoustic beam relative to gravity. In this regard, two extreme situations of a narrow beam—a vertical setup and a horizontal setup—can be derived and compared. As shown in FIGS. 11 and 12, an axial force $F_z$ counters gravity in the vertical setup (FIG. 11) and a radial force $F_x$ counters gravity in the horizontal setup (FIG. 12). For simplicity, it is assumed $B \approx 3/2$ and $\gamma \approx 0$, because $\rho \gg \rho_0$ and $\beta \ll \beta_0$ in this case.

The radial force $F_x$ parallel to the x-axis through the center of a node (see FIG. 12) is obtained as:

$$F_x \equiv -V\frac{\partial U}{\partial x}\bigg|_{(y,z)=\left(0,\frac{\lambda}{4}\right)} \quad (10)$$

$$\simeq \frac{A^2 V}{\rho_0 c^2}\frac{6\pi}{w}\left[\frac{\sin\left(\frac{2\pi x}{w}\right)\cos\left(\frac{2\pi x}{w}\right)}{\left(\frac{2\pi x}{w}\right)^2} - \frac{\sin^2\left(\frac{2\pi x}{w}\right)}{\left(\frac{2\pi x}{w}\right)^3}\right]$$

The maximum value of $F_x/V \cdot g$ is $5\times10^3$ kg/m$^3$ at $x\approx-0.2w$, where g=9.8 m/s$^2$ is the gravitational acceleration and A=5170 Pa. This means that a material can be levitated by $F_x$ if its weight density is smaller than this value. For example, the weight density of polystyrene is approximately $1\times10^3$ kg/m$^3$.

The axial force $F_z$ along the z-axis (see FIG. 11) is obtained as:

$$F_z \equiv -V\frac{\partial U}{\partial z}\bigg|_{(x,y)=(0,0)} \quad (11)$$

$$\simeq \frac{A^2 V}{\rho_0 c^2}\frac{10\pi}{\lambda}\sin\left(\frac{2\pi z}{\lambda}\right)\cos\left(\frac{2\pi z}{\lambda}\right).$$

The maximum value of $F_z/V \cdot g$ is $3.63\times10^4$ kg/m$^3$ at, for example, $z=\lambda/8$. The maximum value of $F_z$ is 7.3 times larger than that of $F_x$, as derived above. This estimation agrees with prior results that lateral restoring forces are approximately 10 times greater in the direction of the main sound beam (37), and explains why $F_z$, rather than $F_x$, was primarily used in conventional studies.

In accordance with the embodiments of the present invention, the radial force $F_x$ can also be utilized to levitate objects because there is sufficient high-amplitude ultrasound owing to the phased arrays 20. It should be noted that not only the weight density but also the size and shape of an object are important factors to determine whether the object can be trapped in the nodes.

The size of the nodes depends on the frequency of the ultrasound and determines the allowable size of the floated objects. The interval between the nodes is $\lambda/2$, and the size of the node is $\lambda/2$ by the width of the ultrasonic beam w. For example, the size of the node is $\lambda/2=4.25$ mm when the frequency of the ultrasound is 40 kHz. When the frequency of the ultrasound is 25 kHz, the size of the node is $\lambda/2=6.8$ mm. The frequency of the ultrasound should be selected based on the intended application. It should be noted that this is a rough guideline for the size of a node, and that objects larger than the size of the node provided by this guideline can be levitated if the protrusion is small/light enough to be supported by the suspending force of the acoustic field.

Figures 13A, 13B:
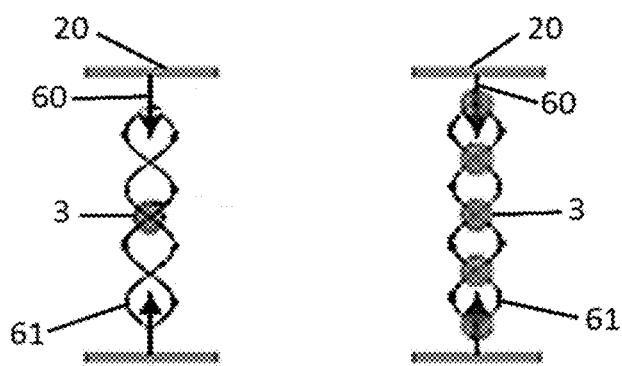
FIG. 13A shows a dot-shaped computational acoustic-potential field in accordance with embodiments of the present invention.
FIG. 13B shows a line-shaped computational acoustic-potential field in accordance with embodiments of the present invention.
Figure 13C:
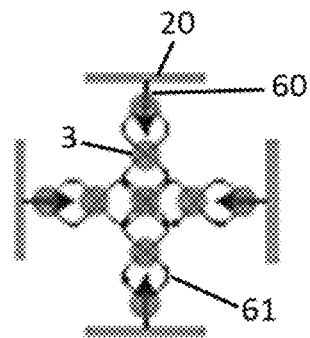
FIG. 13C shows a cross-shaped computational acoustic-potential field in accordance with embodiments of the present invention.
Figure 13D:
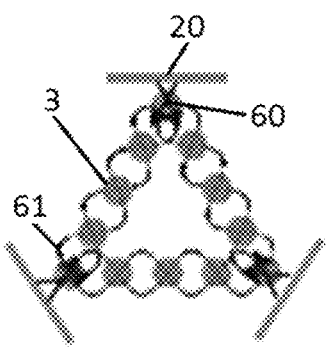
FIG. 13D shows a triangle-shaped computational acoustic-potential field in accordance with embodiments of the present invention.
Figure 13E:
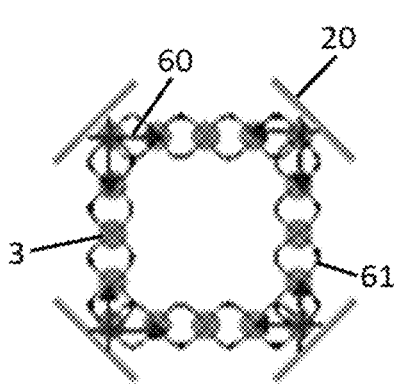
FIG. 13E shows a square-shaped computational acoustic-potential field in accordance with embodiments of the present invention.
Figure 13F:
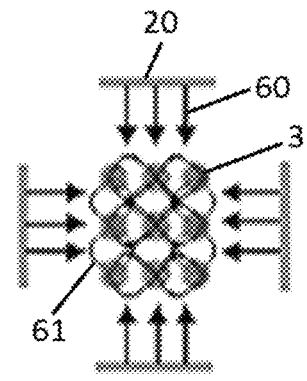
FIG. 13F shows a two dimensional grid-shaped computational acoustic-potential field in accordance with embodiments of the present invention.

Two types of potential fields have been described above: a focal point and focal line. It should be noted that phased arrays control transducers individually, and can thus generate other distributions of potential fields, such as multiple beams. The arrangement of the phased arrays can be used to design the shape of the potential field. For example, a single phased array with a reflector, two opposed phased arrays, four opposed phased arrays, or multiple phased arrays surrounding the workspace are used to generate standing waves to suspend objects at the nodes of the standing waves so that the resulting ultrasound distribution is visualized. FIG. 13 shows examples of computational acoustic-potential fields, where the circular particles indicate the local minima 3 (i.e., nodes) formed by standing waves 61 where objects are held. FIG. 13A shows a dot-shaped potential field created by a pair of ultrasonic phased arrays 20 that each emit a narrow acoustic beam 60. FIG. 13B shows a line-shaped potential field created by a pair of ultrasonic phased arrays 20 that each emit a narrow acoustic beam 60. FIG. 13C shows a cross-shaped potential field created by two pairs of ultrasonic phased arrays 20 that each emit a narrow acoustic beam 60. FIG. 13D shows a triangle-shaped potential field created by three ultrasonic phased arrays 20 that each emit multiple (e.g., two) acoustic beams 60. FIG. 13E shows a square-shaped potential field created by two pairs of ultrasonic phased arrays 20 that each emit multiple (e.g., two) acoustic beams 60. FIG. 13F shows a two dimensional grid-shaped ("2D Grid") dot-matrix potential field created by two pairs of ultrasonic phased arrays 20 that each emit a wide (i.e., sheet) acoustic beams 60 targeting focal lines at the same position.

Other distributions of acoustic-potential fields that can be generated in accordance with the present invention include acoustic-potential fields having arbitrary shapes, including arbitrary three-dimensional shapes. For example, one or more ultrasonic phased arrays surrounding a workspace can be used to generate standing waves of various shapes to provide acoustic-potential fields having arbitrary shapes. Objects can be suspended at the nodes of the acoustic-potential field so that the ultrasound distribution (i.e., the desired arbitrary shape) is visualized.

In accordance with embodiments of the present invention, any desired three-dimensional ultrasound distribution can be generated by ultrasonic computational holography using multiple ultrasonic phased arrays as follows.

The spatial phase control of ultrasound enables the generation of one or more focal points in three-dimensional space for each of the phased arrays. For each phased array, a complex amplitude (CA) of the reconstruction from the computer generated hologram (CGH) $U_r$ is given by the Fourier transform of that of a designed CGH pattern $U_h$:

$$U_r(v_x, v_y) = \int\int U_h(x, y)\exp[-i2\pi(xv_x + yv_y)]dxdy \quad (12)$$
$$= a_r(v_x, v_y)\exp[i\varphi_r(v_x, v_y)]$$

$$U_h(x, y) = a_h(x, y)\exp[i\varphi_h(x, y)] \quad (13)$$

where $a_h$ and $\varphi_h$ are the amplitude and phase, respectively, of the ultrasonic waves radiated from a phased array. For simplicity, $a_h$ can be constant for all the transducers of the phased arrays. It can be adjusted individually for each transducer if required. $\varphi_h$ is derived by an optimal-rotation-angle (ORA) method. $a_r$ and $\varphi_r$ are the amplitude and phase, respectively, of the reconstruction plane. The spatial intensity distribution of reconstruction is actually observed as $|U_r|^2=a_r^2$. The CGH $U_r$ is a representation of an acoustic-potential field distribution from the perspective of a phased array.

In the control of focusing position along the lateral (XY) direction, the CGH is designed based on a superposition of CAs of blazed gratings with variety of azimuth angles. If the reconstruction has N-multiple focusing spots, CGH includes N-blazed gratings. In the control of focusing position along the axial (Z) direction, a phase Fresnel lens pattern $$\varphi_p(x, y) = k\frac{x^2 + y^2}{2f}$$

with a focal length f is simply added to $\varphi_h$ where $$k = \frac{2\pi}{\lambda}$$

is a wave number. In this case, the spatial resolution of the phased array determines the minimum focal length.

The ORA method is an optimization algorithm to obtain the reconstruction of CGH composed of spot array with a uniform intensity. It is based on adding an adequate phase variation calculated by an iterative optimization process into the CGH. In the i-th iterative process, amplitude $a_h$ and phase $\varphi_h^{(i)}$ at a pixel (transducer) h on the CGH plane (i.e., phased array surface), and a complex amplitude (CA) $U_r^{(i)}$ at a pixel r corresponding to focusing position on the reconstruction plane are described in the computer as follows, $$U_r^{(i)} = \omega_r^{(i)}\sum_h u_{hr}^{(i)} \quad (14)$$
$$= \omega_r^{(i)}\sum_h a_h\exp[i(\varphi_{hr} + \varphi_h^{(i)})],$$

where $u_{hr}$ is CA contributed from a pixel (transducer) h on the phased array surface to a pixel r on the reconstruction plane, $\varphi_{hr}$ is a phase contributed by the ultrasound propagation from a pixel (transducer) h to a pixel r, $\omega_r^{(i)}$ is a weight coefficient to control the ultrasound intensity at pixel r. In order to maximize a sum of the ultrasound intensity $\Sigma_r |U_r^{(i)}|^2$ at each pixel r, the phase variation $\Delta\varphi_h^{(i)}$ added to $\varphi_h^{(i)}$ at pixel (transducer) h is calculated using flowing equations.

$$\Delta\varphi_h^{(i)} = \tan^{-1}\left(\frac{S_2}{S_1}\right), \tag{15}$$

$$S_1 = \sum_r \omega_r^{(i)} a_h \cos(\varphi_r - \varphi_{hr} - \varphi_h^{(i)}), \tag{16}$$

$$S_2 = \sum_r \omega_r^{(i)} a_h \sin(\varphi_r - \varphi_{hr} - \varphi_h^{(i)}), \tag{17}$$

where $\omega_r$ is the phase at pixel r on the reconstruction plane. The phase of CGH $\varphi_h^{(i)}$ is updated by calculated $\Delta\varphi_h^{(i)}$ as follows.

$$\varphi_h^{(i)} = \varphi_h^{(i-1)} + \Delta\varphi_h^{(i)}, \tag{18}$$

Furthermore, $\omega_r^{(i)}$ is also updated according to the ultrasound intensity of the reconstruction obtained by the Fourier transform of Eq. (18) in order to control the ultrasound intensity at pixel r on the reconstruction plane $$\omega_r^{(i)} = \omega_r^{(i-1)}\left(\frac{I_r^{(d)}}{I_r^{(i)}}\right)^\alpha \tag{19}$$

where $I_r^{(i)} = |U_r^{(i)}|^2$ is the ultrasound intensity at pixel r on the reconstruction plane in the i-th iterative process, $I_r^{(d)}$ is an desired ultrasound intensity, and a is constant. The phase variation $\Delta\varphi_h^{(i)}$ is optimized by the above iterative process (Eqs. (15)-(19)) until $I_r^{(i)}$ is nearly equal to $I_r^{(d)}$. Consequently, the ORA method facilitates the generation of a high quality CGH.

When generating standing waves using multiple phased arrays, the CGH $U_r$ to be generated by each phased array depends on its spatial position relative to the other phased arrays. For each phased array, the CGH $U_r$ should be rotated according to the relative position of the phased array in order to obtain a $U_h$ for the phased array.

The desired three-dimensional ultrasound distribution is ultimately obtained by superposing the three-dimensional ultrasound distributions provided by each of the ultrasonic phased arrays.

In presently preferred embodiments, the ultrasonic phased array 20 can have a frequency of either 40 kHz or 25 kHz. The position of the focal point is digitally controlled with a resolution of 1/16 of the wavelength (approximately 0.5 mm for the 40-kHz ultrasound) and can be refreshed at 1 kHz. In an embodiment in accordance with the present invention, an ultrasonic phased array 40 has a frequency of 40 kHz and consists of 285 transducers, each of which has a diameter of 10-mm diameter. An exemplary 40-kHz transducer bears model number T4010A1 and is manufactured by Nippon Ceramic Co., Ltd. The ultrasonic transducers are arranged in an array having an area of 170×170 mm² The sound pressure at the peak of the focal point is 2585 Pa RMS (measured) when the focal length R=200 mm. In another embodiment in accordance with the present invention, an ultrasonic phased array 40 has a frequency of 25 kHz and consists of 100 transducers, each of which has a diameter of 16 mm. An exemplary 25-kHz transducer bears model number T2516A1 and is manufactured by Nippon Ceramic Co., Ltd. The sound pressure at the peak of the focal point is 900 Pa RMS (estimated) when the focal length R=200 mm. Using a 25-kHz phased array, the suspending force is much smaller than would be the case if using a 40-kHz phased array, but the size of the focal point is larger than would be the case if using a 40-kHz phased array. In presently preferred embodiments in accordance with the present invention, the ultrasonic phased arrays 40 are 40-kHz phased arrays to obtain a larger suspending force.

In accordance with an embodiment of the present invention, the narrow beams, or the sheet beams, of standing wave are generated in the vicinity of a single target point. The acoustic-potential field changes according to the movement of this target point and then moves the levitated objects. It should be noted that all of the levitated objects in the acoustic-potential field are moved together in the same direction.

Referring to FIG. 4, the PC 10 controls the system 100 under the direction of a control application 12 to effect desired changes in the acoustic-potential field that is generated by the one or more ultrasonic transducer arrays 20. In an embodiment in accordance with the present invention, the control application 12 is developed in C++ on the WINDOWS operating system. The PC 10 sends the necessary data, including the X, Y, and Z coordinates of the focal point and the required output intensity of the ultrasonic beams, to the driving board 21. The driving circuitry 21 receives this data using the USB interface 22, and provides it to the FPGA 23. The phase calculator 27 of FPGA 23 then calculates the appropriate time (or phase) delays for each ultrasonic transducer 26 in the ultrasonic transducer array 25 based on Eqs. (1) or (3). The signal generator 28 then generates the driving signal for each transducer in the transducer array 25 based on the beam intensity data provided by the PC 10 and the time (or phase) delays calculated by the phase calculator 27. The driving signals are then sent to the transducers 26 of the transducer array 25 via the push-pull amplifiers of the drivers 24.

Figure 14:
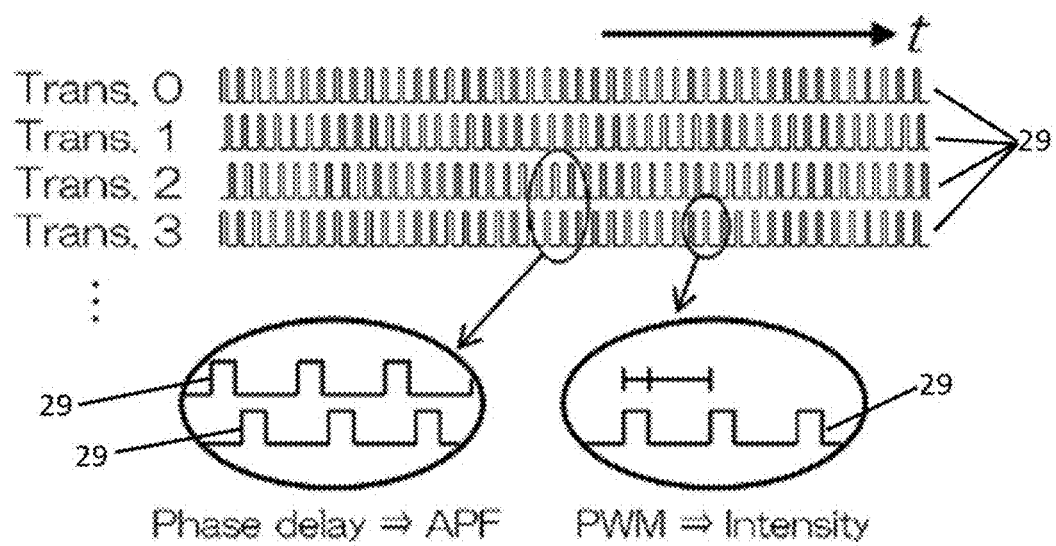
FIG. 14 shows exemplary signals that are applied to the individual ultrasonic transducers of an ultrasonic phased array in accordance with the embodiments of the present invention.

As shown in FIG. 14, modifying the relative time (or phase) delays for the driving signals 29 that are applied to each of the transducers 26 is done to change of the distribution of the acoustic-potential field that is generated by the one or more ultrasonic phased arrays 20. The output intensity of each of the transducers 26 is varied using pulse width modulation ("PWM") control of the driving signal 29 that is applied to the transducer.

The movement of the target point should be as continuous as possible to keep the objects levitated. If the distance between the old and new target points is large, the levitated objects cannot follow the change in the acoustic-potential field. It should be noted that, although the acoustic-potential field generator has a spatial resolution of 0.5 mm and a refresh rate of 1 kHz in an embodiment of the present invention, the inertia of the levitated objects limits the speed of their movement.

The inventors examined the speed of manipulation of objects in presently preferred embodiments by measuring the duration of the cyclical movement of the objects at different frequencies using a 2D Grid setup of ultrasonic phase arrays 20 as shown in FIG. 13F. Their test was conducted using expanded-polystyrene spheres having diameters of 0.6 mm and 2 mm. In each trial, a single particle was set at the third node from the intersection of the ultrasound beams along one of the acoustic axes (i.e., the x-axis). All the directions of movement (i.e., the x direction along an acoustic axis in which the particle is trapped, the z direction along the other axis, and the y direction perpendicular to both the x and y axes) were tested. The focal length was set at 260 mm, and the sound pressure was set to 70. The amplitude of the cyclic movement was 15 mm.

Figure 15A:
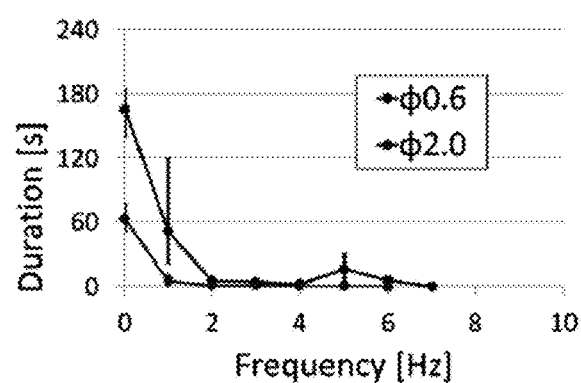
FIG. 15A shows experimental results regarding the speed of manipulation of an object in an acoustic-potential field parallel to the x direction in accordance with embodiments of the present invention.
Figure 15B:
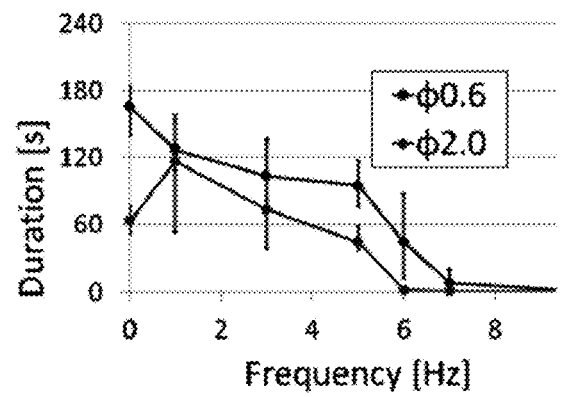
FIG. 15B shows experimental results regarding the speed of manipulation of an object in an acoustic-potential field parallel to the y direction in accordance with embodiments of the present invention.
Figure 15C:
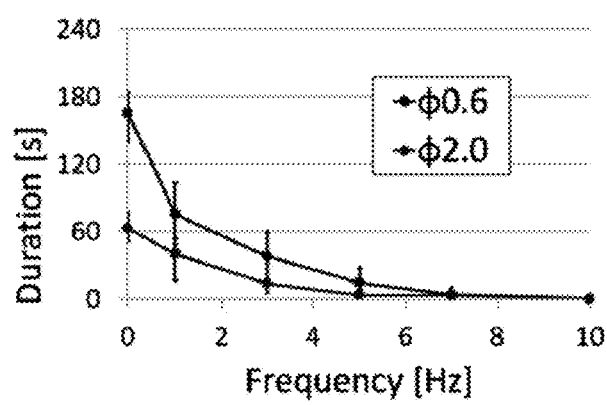
FIG. 15C shows experimental results regarding the speed of manipulation of an object in an acoustic-potential field parallel to the z direction in accordance with embodiments of the present invention.

The results are shown in FIGS. 15A (parallel to the x direction), 15B (parallel to the y direction), and 15C (parallel to the z direction). The points on the graph indicate the average floating time for the different frequencies, and the vertical bars indicate the maximum and minimum values. It can be observed from FIGS. 15A-15C that manipulation along the y axis was more stable than along the other axes, perhaps because manipulations along the x and z axes tend to induce discontinuity in the ultrasound to change the focal length. Moreover, FIGS. 15A-15C show that particles with a diameter of 0.6 mm (represented by the upper graphs in FIGS. 15A-15C) are more stable than those with a diameter of 2 mm (represented by the lower graphs in FIGS. 15A-15C) at higher frequencies. This suggests that larger particles tend to fall from the nodes of a standing wave.

Figure 16A:
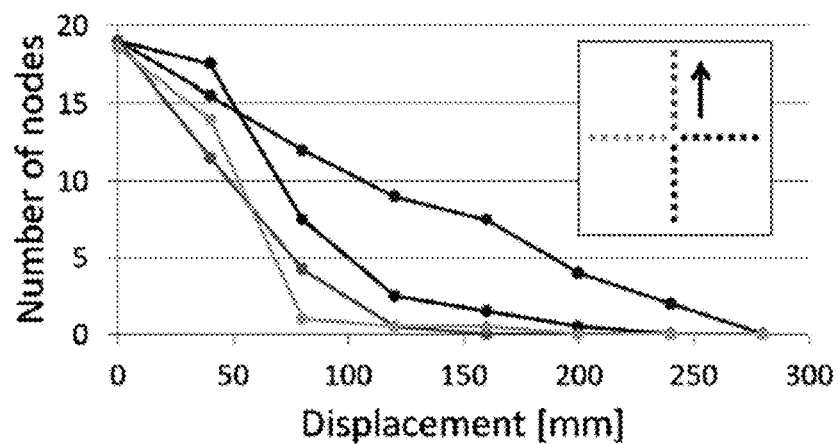
FIG. 16A shows experimental results regarding how an object falls when the focal point moves from the center position of the system to a more distant position along an acoustic axis in accordance with embodiments of the present invention.
Figure 16B:
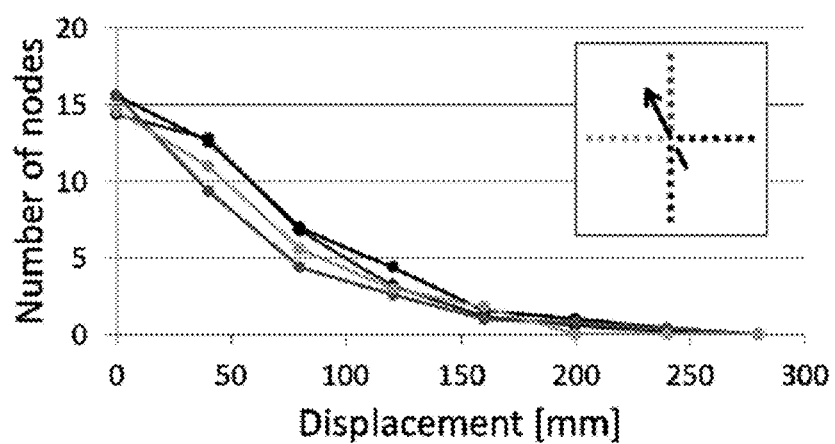
FIG. 16B shows experimental results regarding how an object falls when the focal point moves from the center position of the system to a more distant position perpendicular to the plane of the ultrasonic devices in accordance with embodiments of the present invention.

The inventors also examined the size of the workspace in which the particles are suspended using a setup of ultrasonic phase arrays 20 that provides the cross acoustic-potential field shown in FIG. 13C. Each acoustic beam has 14-19 nodes that are occupied by the levitated particles. FIGS. 16A-16B show how a particle falls when the focal point moves from the center position of the system to a more distant position. FIG. 16A shows movement along an acoustic axis, and FIG. 16B shows movement perpendicular to the plane of the ultrasonic devices. The x axis in FIGS. 16A and 16B shows the distance from the center of the system, and the y axis shows the number of nodes that include particles with a diameter of 0.6 mm.

In the case of movement along one of the acoustic axes in the workspace, the manipulated particles could approach an ultrasound array 20 to within 60 mm, but dropped when the distance became smaller. In the case of movement perpendicular to the acoustic axes, the particles at the more distant nodes dropped earlier when they moved away from the center of the system. A particle at the intersection of the ultrasound beams dropped when it came to within 330 mm of the center.

Figure 17A:
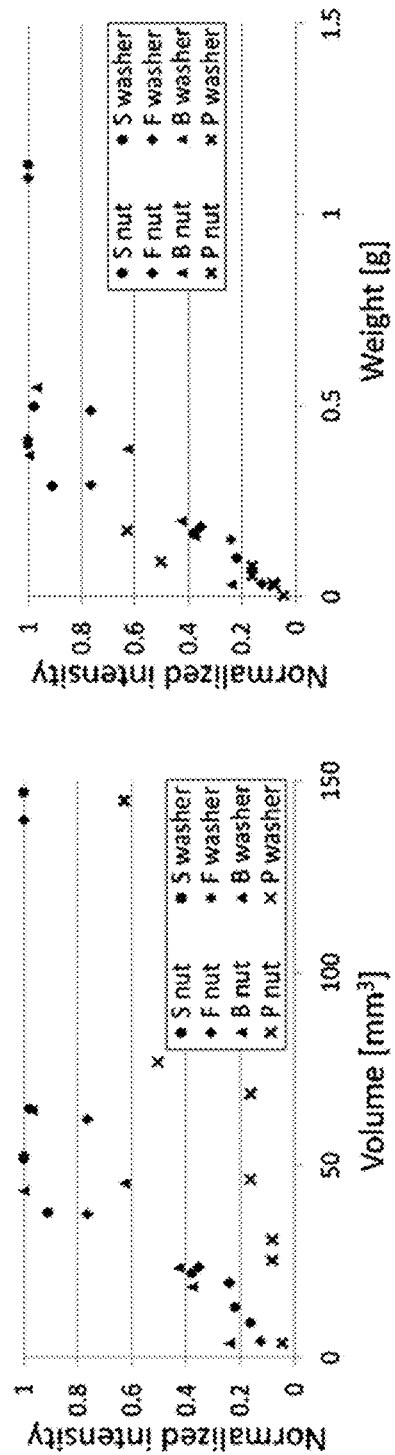
FIG. 17A shows experimental results regarding the volumes and weights of levitated objects for a vertical setup in accordance with embodiments of the present invention.
Figure 17B:
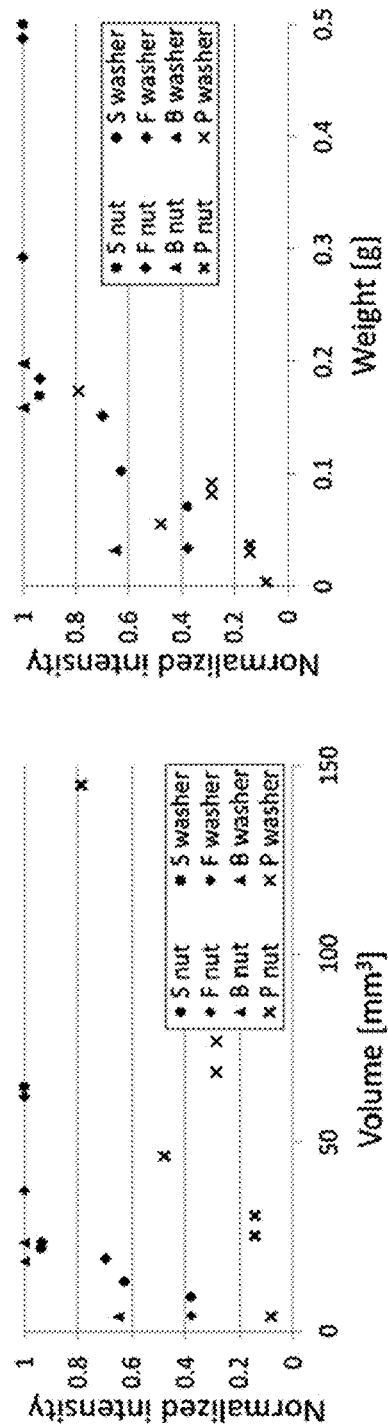
FIG. 17B shows experimental results regarding the volumes and weights of levitated objects for a horizontal setup in accordance with embodiments of the present invention.

The inventors also examined the use of objects made of various materials with the embodiments in accordance with the present invention. They investigated nuts and ring washers made of several sizes and materials, including stainless steel (S, density=7.7 g/cm$^3$), iron (F, 7.8 g/cm$^3$), brass (B, 8.5 g/cm$^3$), and polychlorinated biphenyl ("PCB") (P, 1.2 g/cm$^3$). The nuts and ring washers were levitated in the center of the node in the vertical and horizontal setups shown in FIGS. 11 and 12, respectively. The results are shown in FIGS. 17A and 17B. FIG. 17A shows results for the vertical setup of FIG. 11, and FIG. 17B shows results for the horizontal setup of FIG. 12. The horizontal axes of the graphs shown in FIGS. 17A and 17B represent the volumes or weights of the levitated objects, and the vertical axes of the graphs shown in FIGS. 17A and 17B represent the normalized intensity of the ultrasound. The weight capability of the node is calculated from the size and density of the objects: the axial force $F_z$ in the vertical setup of FIG. 11 can hold up to 1.09 g, and the radial force $F_x$ in the horizontal setup of FIG. 12 can hold up to 0.66 g. The relationship between the amplitude of the ultrasound and mass is also plotted in FIGS. 17A and 17B. Materials having greater densities can be accommodated by adjusting the acoustic pressure of the ultrasound appropriately.

While the embodiments in accordance with the present invention can suspend objects weighing up to 1.09 g and 0.66 g, there are other factors to be considered in addition to the weight of objects—namely, the shape of objects, the intensity of the ultrasound, and the geometry of the acoustic-potential field.

The embodiments in accordance with the present invention have several characteristics that can prove useful in graphics applications. These characteristics include: (1) multiple objects can be levitated and manipulated simultaneously by modification of the acoustic-potential field; (2) levitated objects can be rapidly manipulated, resulting in the production of the effect of persistence of vision; and (3) the choice of which objects to levitate is limited only by the dimensions and the density of the objects.

Figure 18:
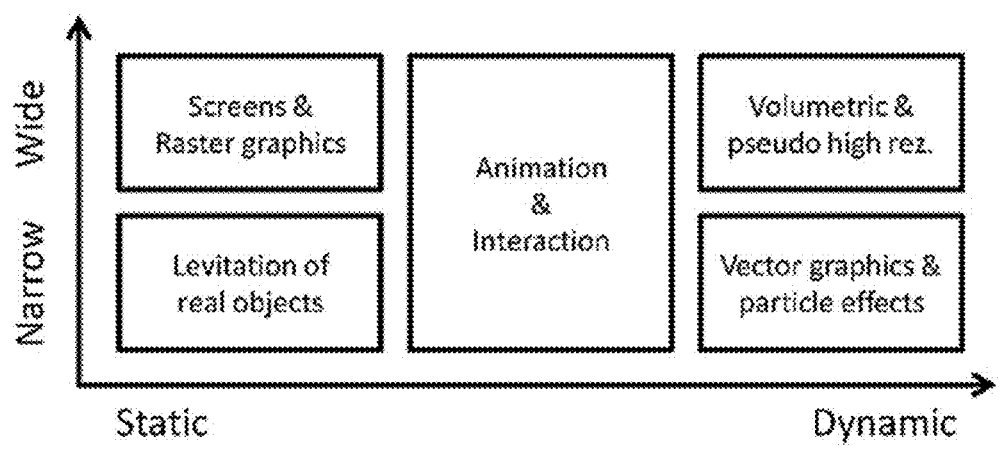
FIG. 18 shows a domain of the applications of embodiments in accordance with the present invention.

In accordance with the embodiments of the present invention, both wide acoustic beams and narrow acoustic beams can be used. The wide beam is used for projection screens and raster graphics, whereas the narrow beam is used for the levitation of various objects and for vector graphics. Furthermore, other applications—animation of real objects, interaction with humans, particle effects, and pseudo-high-screen resolution—can be implemented using either a wide or a narrow acoustic beam, as appropriate. FIG. 18 shows a map of the applications placed according to their speed of motion.

Figure 19:
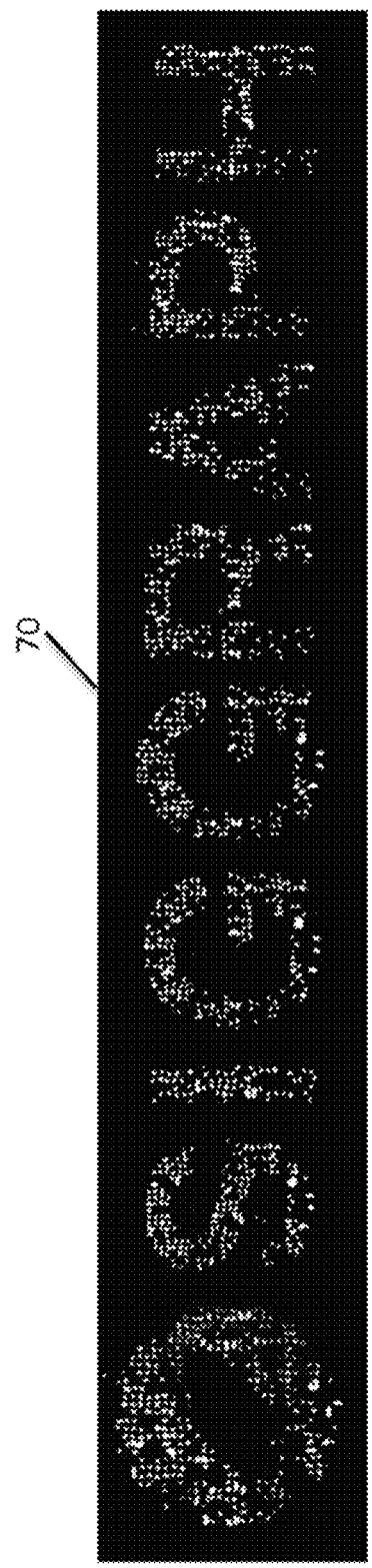
FIG. 19 shows an exemplary mid-air projection screen in accordance with an embodiment of the present invention.
Figure 20:
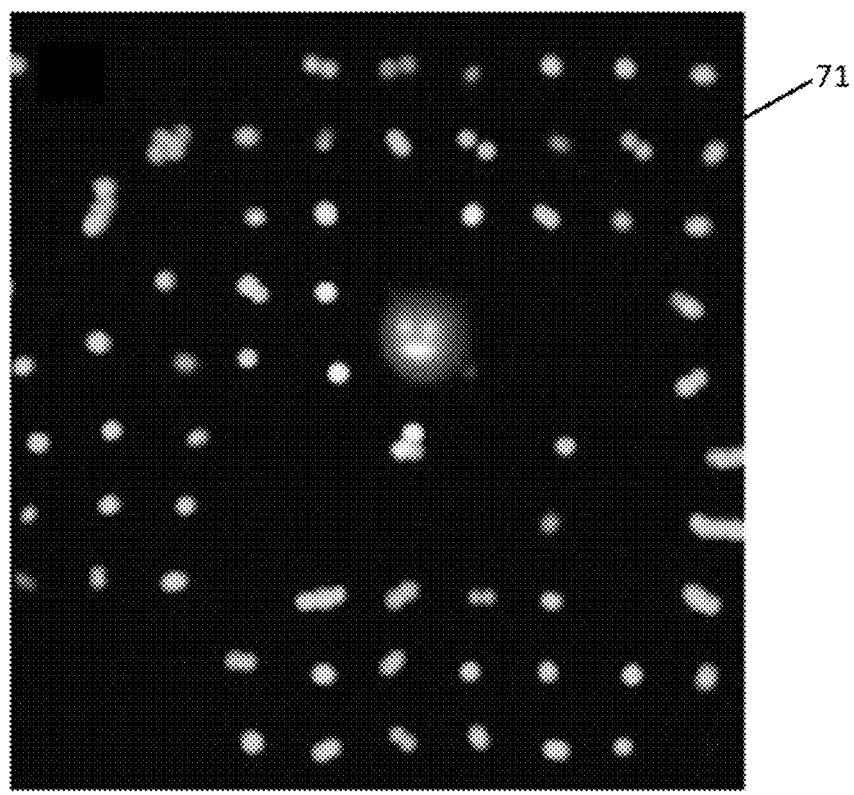
FIG. 20 shows an exemplary mid-air projection screen in accordance with another embodiment of the present invention.

In an alternative embodiment in accordance with the present invention, a 2D Grid acoustic-potential field generated by wide beams, depicted in FIG. 13F, is used to provide a projection screen that is floating in mid-air. Referring to FIGS. 19 and 20, in such floating projection screens 70, 71, small objects 1 are suspended in all the nodes of the 2D Grid acoustic-potential field.

The movement of floating projection screen 70 of FIG. 19 has a high refresh rate and high spatial resolution. In a presently preferred embodiment, the maximum control rate is 1 kHz, the distance between the particles is 4.25 mm, and at the maximum 85×85 particles are held in the acoustic-potential field. This type of mid-air floating screen is applicable for use in areas such as entertainment, shop windows, and interior displays.

Conventional screens include fog screens (32), water drop screens (1), and fog-filled bubble screens (24). However, these conventional screens are mid-air, passive projector screens. In contrast, the spatial position of the projection screen in accordance with the embodiments of the present invention is controllable, and the screen objects can be selected according to the particular application. For example, as shown in FIG. 20, a screen 71 in accordance with the present invention can include a mixture of objects 1 having different sizes. A projection screen in accordance with the embodiments of the present invention can also expand upon conventional systems by, for instance, suspending water drops, holding fog particles, and controlling soap bubbles in the air.

Furthermore, a projection screen in accordance with the embodiments of the present invention can also be moved three-dimensionally (as well as being used in applications involving manipulation and animation of the screen objects). Two types of effects can result from such three-dimensional movement: (1) movement vertical to the screen results in volumetric expression and (2) movement parallel to the screen achieves pseudo-high resolution. In one such embodiment, the screen is moved between various focal points that are generated along an axis that is perpendicular to the plane of the screen (i.e., vertical to the screen) to move the screen toward and away from a viewer in synchronization with the video that is being projected onto the screen. As a result, different frames of the video are displayed on the screen at different distances from the viewer. For example, the different video frames can be different image layers associated with each screen distance, such as a background layer, a foreground layer, and optionally one or more middle layers therebetween. Due to the effect of persistence of vision, a volumetric effect is created thereby with regard to the video. In another embodiment, the screen is moved between various focal points that are generated along an axis that is parallel to the plane of the screen (i.e., parallel to the screen) to move the screen laterally. Due to the effect of persistence of vision, the number of pixels in the screen appears to be increased, and the screen thereby appears to provide a higher resolution.

Figure 21:
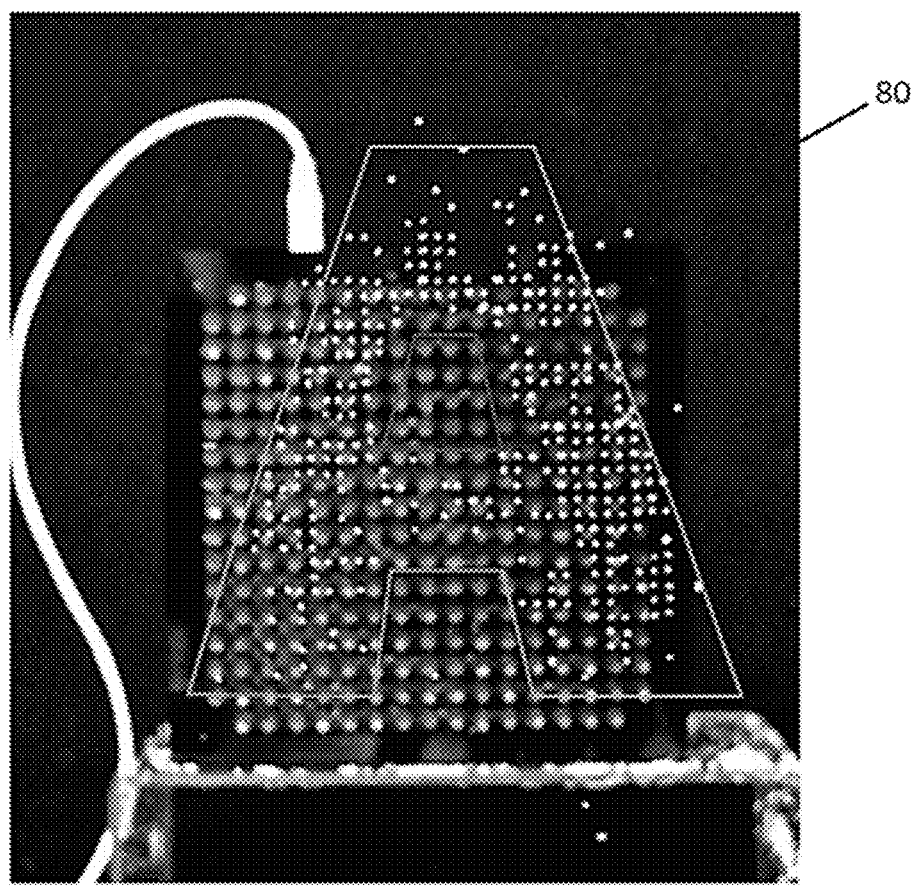
FIG. 21 shows an exemplary raster graphics display in accordance with an embodiment of the present invention.

In accordance with another embodiment of the present invention, a raster graphics display is provided. In an exemplary raster display 80 shown in FIG. 21, the objects 1 are suspended to form the letter "A." In the raster display 80, an acoustic-potential field suspends objects 1 in all of its nodes to the same extent as in the floating projection screen 70 described above. The system 100 then adequately blows off or drops some of the particles to generate a raster image. This process can be performed by an additional ultrasonic phased array, or by an air jet, under control of the control application 12 and PC 10. The accuracy of dropping the particles is approximately 2 cm if done by a phased array and a single pixel if done by an air jet at close range. The control rate of movement and the spatial resolution of pixels for raster display 80 are the same as those of floating projection screen 70 described above.

There are several studies that have focused on mid-air displays. For example, there has been disclosed a three-dimensional volumetric display based on laser-excited plasma that generates an image consisting of luminous points (17). The embodiments in accordance with the present invention differ from this type of volumetric display in that the pixels in the screens in accordance with the present invention are non-luminous and are physical materials. Furthermore, a projector is not necessarily needed, and the natural appearance of a real object is used as an expression. The availability of a non-luminous mid-air display in accordance with the embodiments of the present invention is also useful for design contents and installation.

In yet another alternative embodiment in accordance with the present invention, a cross acoustic-potential field is generated by narrow beams, as depicted in FIG. 13C. By changing the spatial position of the nodes of the acoustic-potential field (either points or lines), the levitated objects are moved. By moving the objects in the acoustic-potential field quickly, a vector graphics display is achieved based on the effect of persistence of vision. In this regard, the inventors performed an experiment using two types of objects as moving objects: 1 mm luminous painted balls and 1 mm polystyrene particles. In the case of the luminous painted balls, light was first irradiated onto those balls and then they were manipulated quickly in mid-air. The trajectories of the balls were designed as a series of coordinates of control points, which were set up to 1,000 points per second.

Figure 22:
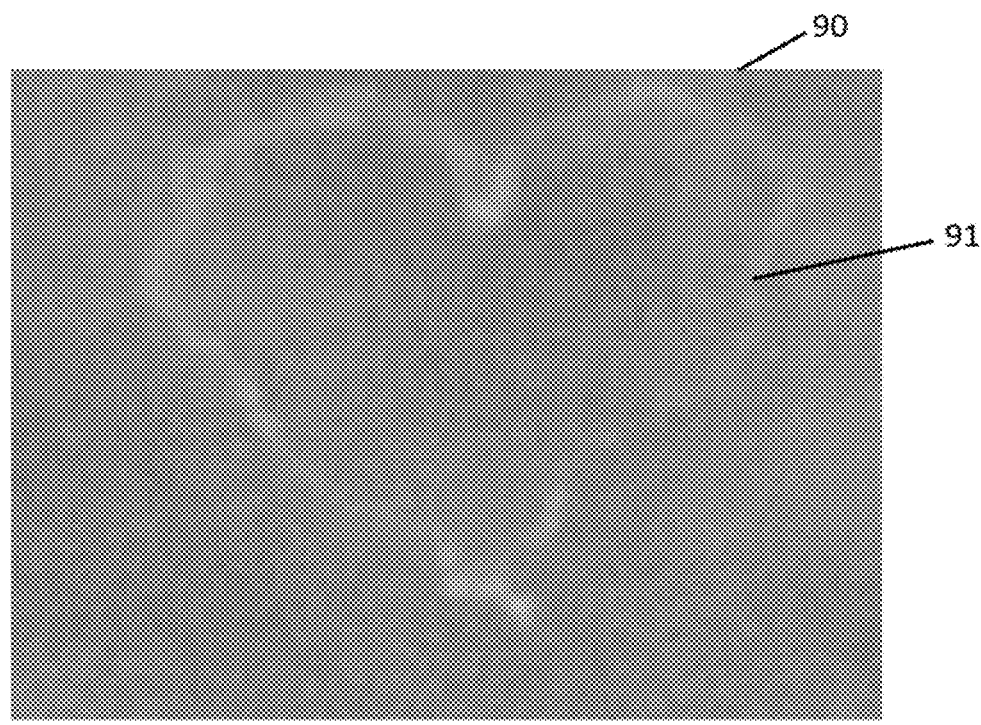
FIG. 22 shows an exemplary raster graphics display in accordance with an embodiment of the present invention.
Figure 23:
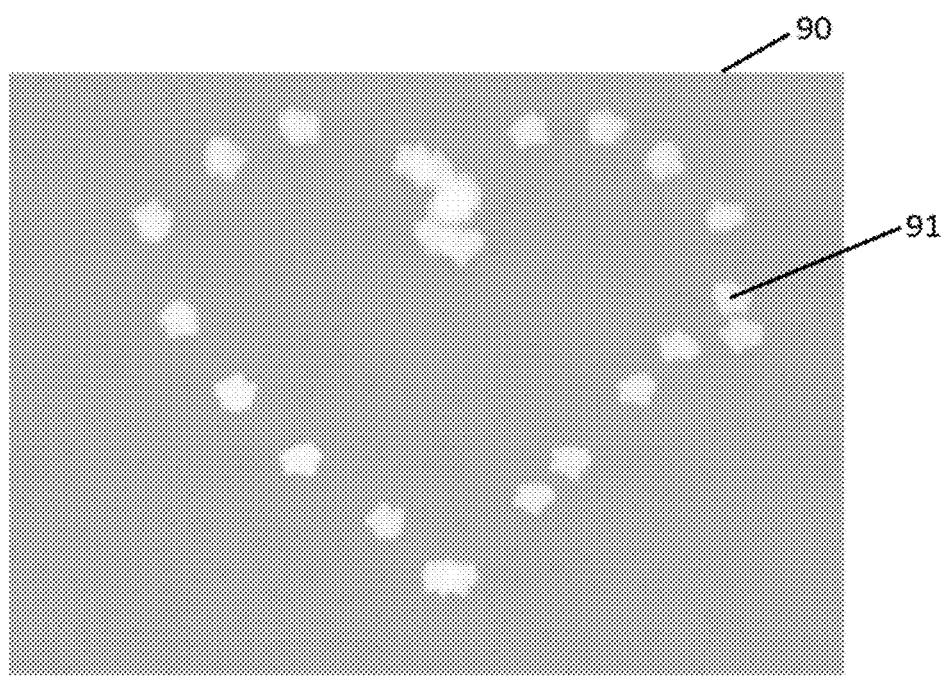
FIG. 23 shows an exemplary vector graphics display in accordance with an embodiment of the present invention.

The results of these experiments showed that the maximum speed of movement of the objects in the acoustic-potential field was 72 cm/s. This speed is enough to produce the effect of persistence of vision. In this regard, FIG. 22 shows a vector graphics display 90 of a heart shape 91, and FIG. 23 shows the vector graphics display 90 of heart shape 91 with a 60 Hz strobe light. A comparison of FIGS. 22 and 23 indicates the presence of the effect of persistence of vision.

Research has been conducted on long-exposure photographs of LED lights (34) and LED-decorated quad-copters (20). However, the embodiments in accordance with the present invention differ from these research studies in that the embodiments in accordance with the present invention render vector graphics in mid-air and in real time, and non-luminous images are obtained with polystyrene balls.

Figure 24:
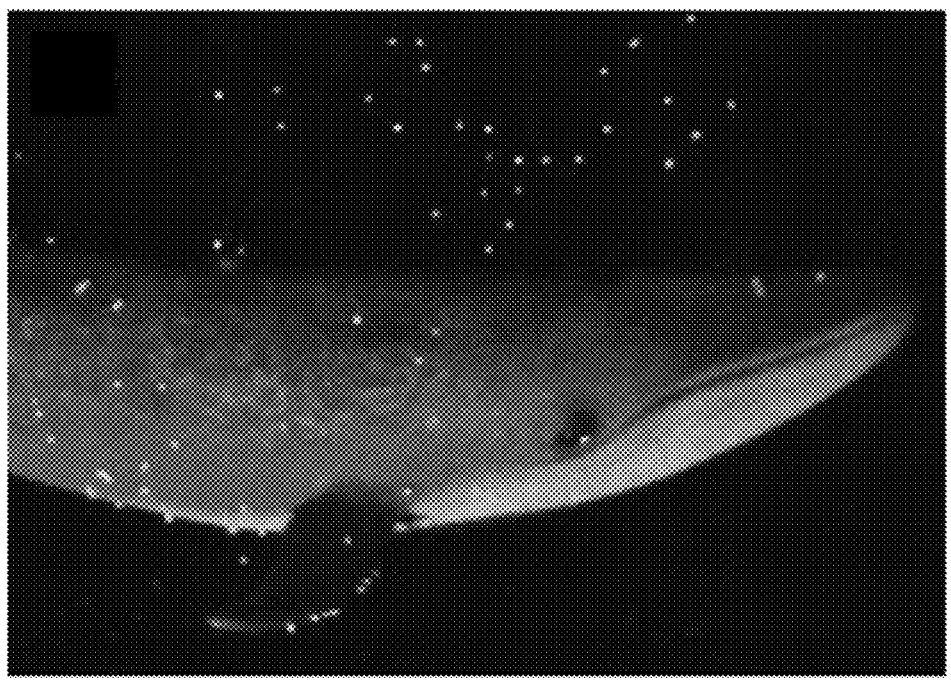
FIG. 24 shows another exemplary vector graphics display in accordance with an embodiment of the present invention.

In another embodiment in accordance with the present invention, the movement of the acoustic-potential field produces not only vector graphics, but also produces particle effects in the real world. For example, FIG. 24 shows an image (of a whale, which is suspended by a string) surrounded by particles 1 that are levitated in the acoustic-potential field. The temporal change in the acoustic-potential field affects the trajectories of the falling particles 1, and the trajectory changes of multiple particles 4 visualize the change in the acoustic-potential field. The speed of the movement of the particles 1 is the same as that of the vector graphics display 90 discussed above.

Figure 25:
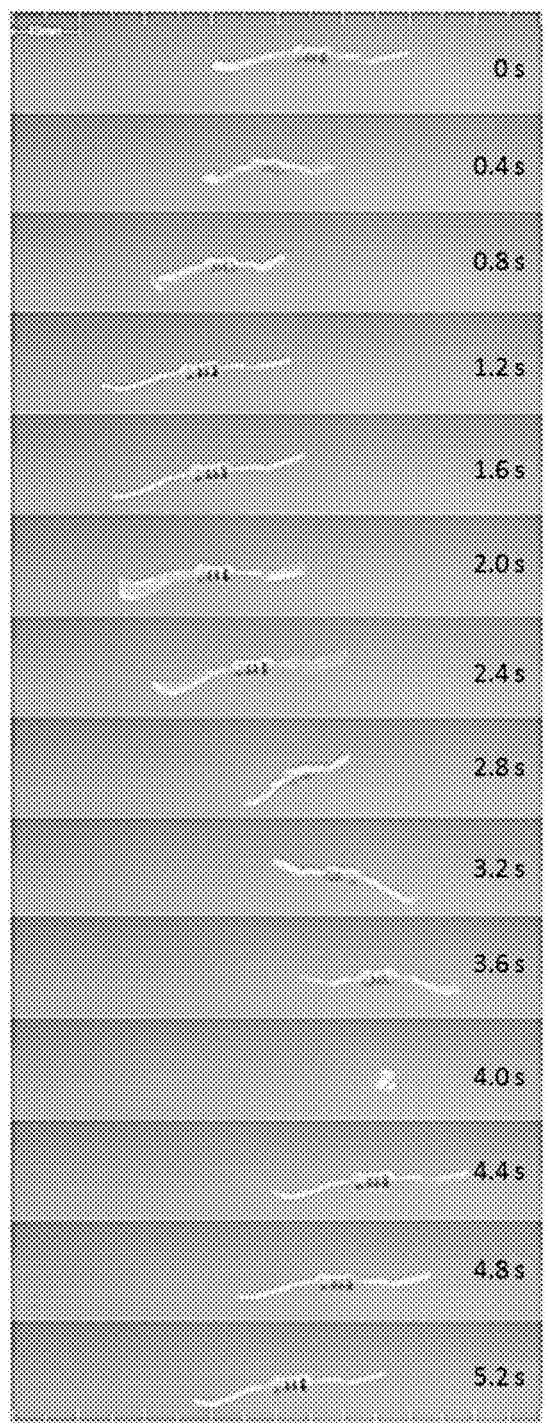
FIG. 25 shows exemplary particle effects in accordance with an embodiment of the present invention.

In accordance with additional aspects of the present invention, both the two-dimensional grid acoustic-potential field and the cross acoustic-potential field offer animation of levitated objects and/or interaction between users and the levitated objects. In accordance with embodiments of the present invention, "passive" and "real-world" objects are animated based on a non-contact manipulation method. For example, FIG. 25 shows a time-series sequence of the animation of a floated object (in this case, a resistor).

In accordance with alternative embodiments of the present invention, the levitation and manipulation system disclosed herein can be combined with a motion-capture system to track the movement of the levitated objects. In one such embodiment, the motion-capture system can be an IR-based system using IR cameras that provide information on the movement of the levitated objects to the control application 12 of the PC 10. Another motion-capture system can be implemented by combining the levitation and manipulation system disclosed herein with the MICROSOFT KINECT sensor. In this setup, the KINECT sensor detects the user without requiring the user to wear any attachments on his body, and the levitated objects are controlled in accordance with the motion of the user's hands as detected by the KINECT sensor.

In choosing the objects to be levitated and manipulated with the system and method disclosed and described herein, there are two factors to consider: (1) the dimensions of the objects and (2) the density of the objects. The allowable dimension of an object is determined by the geometry of the acoustic-potential field. The allowable density of the object material is related to the intensity of ultrasound. As described earlier, the maximum density of a levitated object is theoretically derived as $5 \times 10^3$ kg/m$^3$. Examples of materials that satisfy this condition include light metals and liquids. As also described earlier, the size limitation (i.e., the size of a node) is determined by the frequency of ultrasound: 4.25 mm for 40 kHz and 6.8 mm for 25 kHz. Hence, a lower ultrasonic frequency leads to larger node size.

The internal forces associated with a particular material are also important factors in selecting an object. For example, the electrostatic force of the object material determines the maximum number of objects that can be trapped in a single node. The surface tension of a fluid determines the size of the fluid droplets that can be levitated. Further, the shape of the levitated object is limited by the shape of the node.

Three factors determine the sustainability of the suspension of an object in a node of the acoustic-potential field: the heat condition of ultrasonic devices, oscillation of objects inside the nodes, and acceleration in vector graphics.

The difference in the heat condition of the ultrasonic devices causes a single standing wave to affect the sustainability of the suspension. The temperatures of the ultrasonic devices are equivalent before the devices are turned on. When the ultrasonic devices are turned on, their temperatures gradually increase because of the heat generated by their respective amplifier ICs, whose characteristics are not fully equivalent. When there is such a difference in temperature, the operating frequencies of the controlling circuits of the ultrasonic devices differ. This frequency difference causes the locations of the nodes of the acoustic-potential field to move, and the levitated objects fall when they reach the edge of the localized standing wave. Cooling the ultrasonic devices and maintaining the temperature balance between the devices is one treatment for this problem. Another approach is to adjust the phase delays of the transducers of the ultrasonic phased arrays 40 based on feed-forward or visual feedback control.

Oscillation of levitated objects is another factor to be considered. When the levitated object is subject to some kind of fluctuation, the levitated object undergoes a restoring force from the potential field, resulting in an oscillation of the levitated object. If the intensity of the ultrasound is too high, the oscillation grows and finally exceeds the node of the potential field. The oscillation can be restrained by decreasing the intensity of the ultrasound that keeps the levitated object suspended.

When moving levitated objects, the acceleration of the levitated objects acts to throw them off of their nodes. This factor determines the possible shapes and sizes of the physical vector graphics. Increasing the intensity of ultrasound at sharp curves would elongate the drawing time and expand the variation of physical vector graphics.

In practice, it is acceptable in many cases to refill objects into the acoustic-potential field, if necessary.

The intensity of the ultrasound radiated from a single ultrasonic phased array 20 is in proportion to the number of ultrasonic transducers 26 contained therein. Increasing the number of ultrasonic transducers 26 enables heavier objects to be levitated. In addition to providing a higher intensity, increasing the number of ultrasonic transducers 26 results in other benefits. One such benefit is the ability to keep the size of the focal point in a larger workspace. Another benefit is smaller dispersion of the phase delay characteristics, which leads to more accurate generation and control of the acoustic field.

As previously described, the size of the levitated object is limited by the frequency of the ultrasound. In order to retain its non-audible property, an ultrasonic wave whose frequency is as low as 20 kHz (the maximum frequency that humans can hear) is available. Accordingly, this limitation results in a scalability limit of up to 8 mm for the size of a levitated object.

The maximum manipulation speed of physical vector graphics is 72 cm/s, as described above. Because the workspace is fixed, the acceleration needed to accelerate the levitated object to a given speed is available with a higher intensity of ultrasound.

In a single wide/narrow acoustic beam of a standing wave, all the levitated objects are manipulated together. Multiple beams are generated by, for example, separating a single phased array into several regions and controlling each region individually. In this way, multiple clusters of levitated objects can be controlled individually.

The embodiments in accordance with the present invention have a wide range of setup variations, from 20×20 cm$^2$ to 100 cm$^2$. For example, a 2D Grid acoustic-potential field of the type depicted in FIG. 13F can be arranged with dimensions of 25 cm×25 cm (i.e., each pair of opposing ultrasonic phased arrays 20 is separated by 25 cm), 52 cm×52 cm (i.e., each pair of opposing ultrasonic phased arrays 20 is separated by 52 cm), and 100 cm×100 cm (i.e., each pair of opposing ultrasonic phased arrays 20 is separated by 100 cm). A two-dimensional line acoustic-potential field of the type depicted in FIG. 13B can be arranged with a dimension of 20 cm between ultrasonic phased arrays 20. Larger setups will be possible in the future with larger ultrasonic devices.

As described above, in accordance with certain embodiments of the present invention, "graphics" have been expanded from the digital world to the real (i.e., physical) world. Three-dimensional acoustic manipulation technology, using ultrasonic phased arrays, can be used to turn real objects into graphical components. Such embodiments disclosed and described herein have wide-ranging applications, such as mid-air projection screen, raster graphics, vector graphics, and real-object animation, with appropriately sized objects.

It should be understood that the embodiments of the present invention are not limited to applications involving the generation of graphics in the real world, but also encompass other real-world applications in which objects are to be moved. For example, one such application involves cleaning a dirty surface by removing objects, such as dust and/or powder, from the surface. In such an embodiment, a standing wave(s)—and a resulting acoustic-potential field—are generated at the surface using techniques described earlier herein. In one exemplary embodiment, a standing wave is generated using an ultrasonic phased array and the dirty surface. The dust and/or powder particles are then levitated in the nodes of the acoustic-potential field to remove them from the surface. The dust and/or powder particles are next gathered at a desired location by changing the focal point of the standing waves—which changes the distribution of the nodes in the acoustic-potential field—to deposit the dust and/or powder particles at the desired location. If the objects to be removed from the dirty surface are either too small or too large to be levitated within the nodes of the acoustic-potential field, then such objects can be removed from the dirty surface by blowing them from the dirty surface using the radiation pressure of an acoustic wave generated by an ultrasonic phased array.

In an exemplary embodiment in accordance with the present invention, the standing wave(s) is generated at the surface of the semiconductor wafer to provide a two-dimensional acoustic-potential field to clean dust and/or other unwanted particles from the surface of the semiconductor wafer. As mentioned above, if the objects on the surface of the semiconductor wafer are too small or too large to be levitated in the nodes of the acoustic-potential field, they can be blown off of the surface using the radiation pressure of an acoustic wave. In another exemplary embodiment, an acoustic-potential field is generated near the surface of a three-dimensional figure (e.g., a doll), so that the nodes of the acoustic-potential field are near the surface of the doll. The three-dimensional acoustic-potential field is generated in accordance with the surface geometry of the doll using techniques described earlier herein to clean dust and/or other unwanted particles from the surface of the doll. Here again, if the objects to be removed from the surface of the doll are either too small or too large to be levitated within the nodes of the acoustic-potential field, then such objects can be removed from the surface of the doll by blowing them from the surface using the radiation pressure of an acoustic wave generated by an ultrasonic phased array.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly and is not to be limited by the foregoing specification.

REFERENCES

1. Barnum, P. C., Narasimhan, S. G., and Kanade, T. 2010. A multi-layered display with water drops. *ACM Trans. Graph.* 29, 4 (July), 76:1-76:7.
2. Brandt, E. H. 1989. Levitation in physics. *Science* 243, 4889, 349-55.
3. Carter, T., Seah, S. A., Long, B., Drinkwater, B., and Subramanian, S. 2013. Ultrahaptics: Multi-point mid-air haptic feedback for touch surfaces. In *Proceedings of the 26th Annual ACM Symposium on User Interface Software and Technology*, ACM, New York, N.Y., USA, UIST '13, 505-514.
4. Cossairt, O., Napoli, J., Hill, S., Dorval, R., and Favalora, G. 2007. Occlusion-capable multiview volumetric three-dimensional display. *Applied Optics* 46, 8, 1244-1250.
5. Follmer, S., Leithinger, D., Olwal, A., Hogge, A., and Ishii, H. 2013. inForm: Dynamic physical affordances and constraints through shape and object actuation. In *Proceedings of the 26th Annual ACM Symposium on User Interface Software and Technology*, ACM, New York, N.Y., USA, UIST '13, 417-426.
6. Foresti, D., Nabavi, M., Klingauf, M., Ferrari, A., and Poulikakos, D. 2013. Acoustophoretic contactless transport and handling of matter in air. *Proceedings of the National Academy of Sciences.*
7. Goldstein, S. C., Campbell, J. D., and Mowry, T. C. 2005. Programmable matter. *IEEE Computer* 38, 6 (June), 99-101.
8. Gor'kov, L. P. 1962. On the forces acting on a small particle in an acoustical field in an ideal fluid. *Soviet Physics Doklady* 6, 773-775.
9. Heiner, J. M., Hudson, S. E., and Tanaka, K. 1999. The information percolator: Ambient information display in a decorative object. In *Proceedings of the 12th Annual ACM Symposium on User Interface Software and Technology*, ACM, New York, N.Y., USA, UIST '99, 141-148.
10. Hoshi, T., Takahashi, M., Iwamoto, T., and Shinoda, H. 2010. Noncontact tactile display based on radiation pressure of airborne ultrasound. *IEEE Transactions on Haptics* 3, 3, 155-165.
11. Hoshi, T. 2012. Compact ultrasound device for noncontact interaction. In *Advances in Computer Entertainment*, Springer, A. Nijholt, T. Romao, and D. Reidsma, Eds., vol. 7624 of *Lecture Notes in Computer Science*, 502-505.
12. Ishii, H., and Ullmer, B. 1997. Tangible bits: Towards seamless interfaces between people, bits and atoms. In *Proceedings of the ACM SIGCHI Conference on Human Factors in Computing Systems*, ACM, New York, N.Y., USA, CHI '97, 234-241.
13. Ishii, H., Lakatos, D., Bonanni, L., and Labrune, J.-B. 2012. Radical atoms: Beyond tangible bits, toward transformable materials. *interactions* 19, 1 (January), 38-51.
14. Iwaki, S., Morimasa, H., Noritsugu, T., and Kobayashi, M. 2011. Contactless manipulation of an object on a plane surface using multiple air jets. In *ICRA*, IEEE, 3257-3262.
15. Iwata, H., Yano, H., Nakaizumi, F., and Kawamura, R. 2001. Project feelex: Adding haptic surface to graphics. In *Proceedings of the 28th Annual Conference on Computer Graphics and Interactive Techniques*, ACM, New York, N.Y., USA, SIGGRAPH '01, 469-476.
16. Jones, A., McDowall, I., Yamada, H., Bolas, M., and Debevec, P. 2007. Rendering for an interactive 360° light field display. *ACM Trans. Graph.* 26, 3 (July).
17. Kimura, H., Asano, A., Fujishiro, I., Nakatani, A., and Watanabe, H. 2011. True 3d display. In *ACM SIGGRAPH 2011 Emerging Technologies*, ACM, New York, N.Y., USA, SIGGRAPH '11, 20:1-20:1.
18. Kono, M., Kakehi, Y., and Hoshi, T., 2013. lapillus bug. SIGGRAPH Asia 2013 Art Gallery.
19. Kozuka, T., Yasui, K., Tuziuti, T., Towata, A., and Iida, Y. 2007. Noncontact acoustic manipulation in air. *Japanese Journal of Applied Physics* 46, 7S, 4948.
20. Landis, H., 2013. Spaxels. Ars Electronica 2013.
21. Lee, C., Diverdi, S., and Hollerer, T. 2009. Depth-fused 3d imagery on an immaterial display. *IEEE Trans. Vis. Comput. Graph.* 15, 1, 20-33.
22. Lee, J., Post, R., and Ishii, H. 2011. ZeroN: Mid-air tangible interaction enabled by computer controlled magnetic levitation. In *Proceedings of the 24th Annual ACM Symposium on User Interface Software and Technology*, ACM, New York, N.Y., USA, UIST '11, 327-336.
23. Marshall, M., Carter, T., Alexander, J., and Subramanian, S. 2012. Ultra-tangibles: Creating movable tangible objects on interactive tables. In *Proceedings of the SIGCHI Conference on Human Factors in Computing Systems*, ACM, New York, N.Y., USA, CHI '12, 2185-2188.
24. Nakamura, M., Inaba, G., Tamaoki, J., Shiratori, K., and Hoshino, J. 2006. Mounting and application of bubble display system: Bubble cosmos. In *Proceedings of the 2006 ACM SIGCHI International Conference on Advances in Computer Entertainment Technology*, ACM, New York, N.Y., USA, ACE '06.
25. Nijholt, A., Giusti, L., Minuto, A., and Marti, P. 2012. Smart material interfaces: "a material step to the future". In *Proceedings of the 1st Workshop on Smart Material Interfaces: A Material Step to the Future*, ACM, New York, N.Y., USA, SMI '12, 1:1-1:3.
26. Nyborg, W. L. 1967. Radiation pressure on a small rigid sphere. *Journal of Acoustical Society of America* 42, 947-952.
27. Ochiai, Y., Hoshi, T., Oyama, A., and Rekimoto, J. 2013. Poppable display: A display that enables popping, breaking, and tearing interactions with people. In *Consumer Electronics (GCCE), 2013 IEEE 2nd Global Conference on*, 124-128.
28. Ochiai, Y., Hoshi, T., and Rekimoto, J. 2014. Three-dimensional mid-air acoustic manipulation by ultrasonic phased arrays. *PLOS ONE* 9, 5, e97590.
29. Perlin, K., and Han, J., 2006. Volumetric display with dust as the participating medium, February 14. U.S. Pat. No. 6,997,558.

30. Poupyrev, I., Nashida, T., Maruyama, S., Rekimoto, J., and Yamaji, Y. 2004. Lumen: Interactive visual and shape display for calm computing. In *ACM SIGGRAPH* 2004 *Emerging Technologies*, ACM, New York, N.Y., USA, SIGGRAPH '04, 17-.
31. Poupyrev, I., Nashida, T., and Okabe, M. 2007. Actuation and tangible user interfaces: the vaucanson duck, robots, and shape displays. In *Tangible and Embedded Interaction*, ACM, B. Ullmer and A. Schmidt, Eds., 205-212.
32. Rakkolainen, I., Diverdi, S., Olwal, A., Candussi, N., HU Llerer, T., Laitinen, M., Piirto, M., and Palovuori, K. 2005. The interactive fogscreen. In *ACM SIGGRAPH* 2005 *Emerging Technologies*, ACM, New York, N.Y., USA, SIGGRAPH '05.
33. Sodhi, R., Poupyrev, I., Glisson, M., and Israr, A. 2013. Aireal: Interactive tactile experiences in free air. *ACM Trans. Graph.* 32, 4 (July), 134:1-134:10.
34. TOCHKA. Tochka. http://tochka.jp/ Last accessed on 30 Apr. 2013.
35. Weber, R., Benmore, C., Tumber, S., Tailor, A., Rey, C., Taylor, L., and Byrn, S. 2012. Acoustic levitation: recent developments and emerging opportunities in biomaterials research. *European Biophysics Journal* 41, 4, 397-403.
36. Wetzstein, G., Lanman, D., Heidrich, W., and Raskar, R. 2011. Layered 3d: Tomographic image synthesis for attenuation-based light field and high dynamic range displays. *ACM Trans. Graph.* 30, 4 (July), 95:1-95:12.
37. Whymark, R. 1975. Acoustic field positioning for containerless processing. *Ultrasonics* 13, 6, 251-261.
38. Xie, W. J., Cao, C. D., Lu, Y., Hong, Z. Y., and Wei, B. 2006. Acoustic method for levitation of small living animals. *Applied Physics Letters* 89, 21 (November), 214102-214102-3.

We claim:

1. A method of generating an acoustic-potential field using a pair of phased arrays opposite each other, each phased array comprising a plurality of ultrasonic transducers arranged in columns, the method comprising the steps of:
   receiving holographic information representative of a desired acoustic-potential field;
   identifying target coordinates for a plurality of focal points based on the holographic information;
   targeting the focal points with each column of ultrasonic transducers;
   determining phase information between each of the focal points and each ultrasonic transducer within each column of ultrasonic transducers; and
   using the phase information to generate ultrasonic waves from the phased arrays of ultrasonic transducers to form standing waves at the focal points.

2. The method of claim 1, wherein the plurality of focal points are provided at arbitrary positions in three-dimensional space.

3. The method of claim 1, wherein the standing waves are formed in three dimensions.

4. The method of claim 1, further comprising the step of suspending objects in nodes of the standing waves.

5. The method of claim 1, further comprising the step of visualizing the desired acoustic-potential field.

6. The method of claim 5, wherein the visualizing step comprises the step of suspending objects in nodes of the standing waves.

7. The method of claim 1, involving a plurality of phased arrays of ultrasonic transducers, further comprising the steps of:
   orienting the holographic information relative to a spatial position of each of the plurality of phased arrays of ultrasonic transducers;
   identifying target coordinates for the plurality of focal points based on the oriented holographic information for each phased array of ultrasonic transducers;
   targeting the focal points with each column of ultrasonic transducers;
   determining the phase information between each of the focal points and each ultrasonic transducer within each column of ultrasonic transducers; and
   using the phase information to generate ultrasonic waves from each phased array of ultrasonic transducers to form standing waves at each of the plurality of focal points.

8. The method of claim 1, wherein the step of targeting the focal point targets a separate focal point with each column of ultrasonic transducers in accordance with the equation $\Delta t_{ij} = (l_{0j} - l_{ij})/c$, wherein
   $\Delta t_{ij}$ represents a time delay for the application of a drive signal to an ultrasonic transducer in a column of ultrasonic transducers relative to the application of a drive signal to a reference ultrasonic transducer for that column,
   $l_{0j}$ represents a distance from the focal point targeted by that column of ultrasonic transducers to the reference transducer for that column,
   $l_{ij}$ represents the distance from the focal point targeted by that column to a non-reference ultrasonic transducer for that column, and
   c represents the speed of sound in air.

9. A system for generating an acoustic-potential field using a pair of phased arrays opposite each other, each phased array comprising a plurality of ultrasonic transducers arranged in columns, the system comprising:
   a calculator configured to receive holographic information representative of a desired acoustic-potential field, identify target coordinates for a plurality of focal points based on the holographic information, target the focal points with each column of ultrasonic transducers, and determine phase information between each of the focal points and each ultrasonic transducer within each column of ultrasonic transducers; and
   a generator configured to use the phase information to generate ultrasonic waves from the phased arrays of ultrasonic transducers to form standing waves at the focal points.

10. The system of claim 9, wherein the plurality of focal points are provided at arbitrary positions in three-dimensional space.

11. The system of claim 9, wherein the standing waves are formed in three dimensions.

12. The system of claim 9, wherein objects are suspended in nodes of the standing waves.

13. The system of claim 9, further comprising a visualizer configured to visualize the desired acoustic-potential field.

14. The system of claim 13, wherein the visualizer suspends objects in nodes of the standing waves.

15. The system of claim 9, further comprising a plurality of pairs of phased arrays of ultrasonic transducers, the phased arrays in each pair of phased arrays disposed opposite each other, wherein the calculator orients the holographic information relative to a spatial position of each of the plurality of phased arrays of ultrasonic transducers, identifies target coordinates for the plurality of focal points based on the oriented holographic information for each phased array of ultrasonic transducers, targets the focal points with each column of ultrasonic transducers, and determines the phase information between each of the focal points and each ultrasonic transducer within each column of ultrasonic transducers, and the generator uses the phase information to generate ultrasonic waves from each phased array of ultrasonic transducers to form standing waves at each of the plurality of focal points.

* * * * *